United States Patent [19]

Roberts et al.

[11] Patent Number: 5,027,406

[45] Date of Patent: Jun. 25, 1991

[54] METHOD FOR INTERACTIVE SPEECH RECOGNITION AND TRAINING

[75] Inventors: Jed Roberts, Cambridge; James K. Baker, West Newton; Edward W. Porter, Boston, all of Mass.

[73] Assignee: Dragon Systems, Inc., Newton, Mass.

[21] Appl. No.: 280,700

[22] Filed: Dec. 6, 1988

[51] Int. Cl.$^5$ ............................................. G10L 7/08
[52] U.S. Cl. ................................................... 381/43
[58] Field of Search ................................. 381/41–46, 381/110; 364/513.5

[56] References Cited

U.S. PATENT DOCUMENTS

| | | | |
|---|---|---|---|
| 4,277,644 | 7/1981 | Levinson et al. | 381/43 |
| 4,653,097 | 3/1987 | Watanabe et al. | 381/42 |
| 4,817,156 | 3/1989 | Bahl et al. | 381/43 |
| 4,829,576 | 5/1989 | Porter | 381/43 |
| 4,829,577 | 5/1989 | Kuroda et al. | 381/43 |
| 4,866,778 | 9/1989 | Baker | 381/43 |
| 4,882,757 | 11/1989 | Fisher et al. | 381/43 |

FOREIGN PATENT DOCUMENTS 0002039  1/1981  Japan .

OTHER PUBLICATIONS

Nassimbene, "Speech Technique for Data Entry to Word Processing Equipment", IBM Technical Disclosure, vol. 22, No. 7, 12/79, pp. 2891-2892.

Primary Examiner—Dale M. Shaw
Assistant Examiner—John A. Merecki
Attorney, Agent, or Firm—Edward W. Porter

[57] ABSTRACT

A method for creating word models for a large vocabulary, natural language dictation system. A user with limited typing skills can create documents with little or no advance training of word models. As the user is dictating, the user speaks a word which may or may not already be in the active vocabulary. The system displays a list of the words in the active vocabulary which best match the spoken word. By keyboard or voice command, the user may choose the correct word from the list or may choose to edit a similar word if the correct word is not on the list. Alternately, the user may type or speak the initial letters of the word. Then the recognition algorithm is called again satisfying the initial letters, and the choices displayed again. A word list is then also displayed from a large backup vocabulary. The best words to display from the backup vocabulary are chosen using a statistical language model and optionally word models derived from a phonemic dictionary. When the correct word is chosen by the user, the speech sample is used to create or update an acoustic model for the word, without further intervention by the user. As the system is used, it also constantly updates its statistical language model. The system gets more and more word models and keeps improving its performance the more it is used. The system may be used for connected speech as well as for discrete utterances.

48 Claims, 21 Drawing Sheets

User says "Invention"

User types "I"

User types "nve"

User presses f5

User says "relates"

User types "s"

User presses "enter" key

User says "to"

User types "t"

User says "I knew this play"

User presses f3

User says "a new display"

User double-clicks f 1

User presses right arrow

User presses f2

After rerecognition

User presses "enter"

METHOD FOR INTERACTIVE SPEECH RECOGNITION AND TRAINING

FIELD OF THE INVENTION

This invention relates to methods and apparatus for speech recognition and for training models for use in speech recognition, and, in particular, to such methods and apparatus which decrease the time the user must spend training the recognition system and which increase the recognition performance.

BACKGROUND OF THE INVENTION

In recent years, increasingly powerful speech recognition systems have begun to appear. For example, the assignee of the present invention markets a speech recognition system capable of recognizing active vocabularies up to 5,000 words in real-time on a personal computer. To get the best possible performance on difficult tasks such as recognition of a vocabulary of 5,000 words or more, it is desirable to train the system to the voice of each individual user. It is also desirable to customize the vocabulary to the particular subject matter and to the vocabulary usage of the individual user. To get the best results in recognizing unconstrained natural text, it is desirable to use higher-level linguistic knowledge that predicts which words are most probable, based on the context.

However, to make it possible to train the system to the voice of the individual user, it has been necessary in prior art speech recognition systems for the user to record the entire vocabulary, or else to separately record a special training or enrollment vocabulary before any words can be recognized. To customize the vocabulary and the higher-level linguistic knowledge, it has been necessary for the user to supply large amounts of sample text from which the statistical linguistic characteristics can be derived. There is a significant amount of time, effort, and expense that is necessary before such a large vocabulary, natural language recognition system is ready to be used by a new speaker or in a new area of subject matter.

Among the techniques in prior art speech recognition to limit or reduce the training and customization time is the use of speaker-independent acoustic models. Unfortunately, speaker-independent acoustic models must allow for the total amount of variability in the way a given word can be pronounced by many different speakers. This tends to result in fuzzy, or poorly defined, word models. With this variability, or fuzziness, there will be a greater amount of overlap between the region of acoustic parameter space that represents a given sound and the region which represents a different, but similar sound. Thus, other things being equal, there will be a higher error rate in a speech recognition system using speaker-independent acoustic models than in a speech recognition system using speaker-dependent acoustic models. For large vocabulary, natural language speech recognition tasks, it is important to get the highest possible performance in the acoustic recognition, because the overall recognition task is very difficult.

To get the best possible performance, therefore, the acoustic models and the linguistic model should be customized. The disadvantage of the customization, however, is the cost in time of the customization; and the delay before the speech recognition system can be used for productive work.

SUMMARY OF THE INVENTION

It is an object of the present invention to provide a speech recognition system which improves the speed and accuracy with which users can dictate desired text.

It is another object of the present invention to provide an interactive speech recognition system in which the user can begin productive work on large vocabulary, natural language dictation tasks with little or no advance training of word models.

It is also an object of this invention to provide a speech recognition system which enables a user to add words to the speech recognition vocabulary in a quick and easy manner.

It is a further object of this invention to provide improved speech recognition performance by providing an improved means to build acoustic models from tokens that are collected during actual use of the system rather than during a separate training or enrollment process.

It is still another object of this invention to provide a system which enables a user to easily correct errors made in continuous speech recognition.

It is yet another object of this invention to enable a user to develop a language model for use in a speech recognition system which is customized to his or her particular dictation, without requiring much additional effort to obtain such customization.

The following summary of the invention has been abbreviated and simplified in the interest of brevity. A more complete and accurate description of the invention is contained in the Detailed Description Of Preferred Embodiments and the claims which follow.

According to one aspect of the present invention, a system for creating word models is provided. The system includes means for making an acoustic model from one or more utterances of a word and means for enabling a user to associate a sequence of textual characters with that acoustic model. This latter means includes means for indicating to the user a menu of character sequences; means for enabling the user to select a given character sequence from the menu; means for enabling the user to edit the selected character sequence; and means for associating the edited character sequence with the acoustic model.

Preferably the menu of character sequences is a list of best matching words produced by speech recognition of one of the training utterances, and the user can select and edit the desired menu choice by voice. It is also preferred that the system is used as part of a speech recognition system which produces as its output for each spoken word either the word recognized or the word edited and selected for that spoken word.

According to another aspect of the invention an adaptive speech recognition method is provided which stores acoustic descriptions of utterances for words spoken in the recognition process, makes acoustic models for individual words by using one or more acoustic descriptions stored for each such individual word, and uses such models in subsequent recognition.

According to another aspect of the invention, a speech recognition system is provided which comprises means for comparing both individually trained and non-individually-trained phonetic acoustic word models against the acoustic description of a given portion of speech to be recognized and for selecting which one or more of each of these two different types of word models best match the acoustic description.

According to another aspect of the invention, a speech recognition system is provided which, in response to a portion of speech to be recognized, indicates machine responses selected both with and without acoustic recognition against the portion of speech to be recognized and lets a user select the desired response from those indicated responses. Preferably the machine responses selected between are normally the output of text strings representing the spelling of words selected as matching the speech to be recognized. It is also preferred that the system includes means for enabling the user to enter one or more textual characters, and means for filtering, or limiting, the non-acoustically selectable responses to those associated with words which include the entered characters. It is also preferred that the filtering of non-acoustically selectable responses also be based on language model information. Preferably the acoustically and non-acoustically selected responses are indicated differently to the user, so he will know which are which, and if a non-acoustically selected response is chosen by the user, an acoustic model is made for the chosen response using the acoustic description of the utterance associated with the chosen response. It is also preferred that the user be able to choose from among the indicated responses by voice.

According to another aspect of the invention, a system for enabling a user to create word models for use in speech recognition is provided which enables a user to enter filtering information which specifies a subset of machine responses to which the desired machine response belongs. In response, a filtering means selects a subset of machine responses, limited to the specified subset, which are indicated to the user. Means enable the user to select which of the indicated machine responses is to be associated with a word model to be trained.

In a Preferred embodiment, the filtering means limit the active vocabulary of a recognition means and the results of the filtered recognition are indicated to the user for selection. The user is enabled to select from among the indicated responses and to enter filtering information by voice. Preferably the filtering information is a character string, which the user enters either one character at a time or by selecting one of a plurality of string choices indicated by the system. Once entered, the user can edit that string, and the filtering means selects a subset of machine responses associated with spellings which contain that edited string. The string choice selected for indication to the user are selected by the system both with and without speech recognition.

According to another aspect of the invention, a system for enabling a user to create word models for use in speech recognition is provided which includes a language model; filtering means for selecting a subset of machine responses based on their associated language model probabilities; means for indicating machine responses selected by the filtering means; and means enabling the user to select one of the indicated machine responses for association with a word model to be trained.

In the preferred embodiment the machine responses each have spellings associated with them and the user is enabled to edit the spelling of the selected machine response which is associated with the word model to be trained. Preferably the language model probabilities take into account language context, and the system is used in a speech recognition system that produces as an output either a word selected by said recognition means or a word associated with the indicated machine response selected by the user. It is also preferred that the user be able to select indicated machine responses by voice.

According to other aspects of the invention, a continuous speech recognition system is provided which indicates one or more best scoring word sequences selected by a recognition means. When a plurality of best scoring sequences are indicated for a given portion of speech to be recognized, the system provides means for enabling the user to select one of the indicated best matching word sequences for use as an output, including means for making that selection by voice. The system also enables the user to select an individual word from a given indicated best matching word sequence, and to correct that word sequence by correcting the selected word. Preferably the word to be corrected can be selected by voice. Once the word has been selected for correction, the system provides a choice of alternate words to replace the word to be corrected by performing speech rerecognition against the speech corresponding to the word to be corrected. The user can restrict the choice of alternate words by entering filtering information specifying a subset of words to which the desired word belongs. After the word to be corrected is replaced, the system uses the replaced word to help rerecognize the rest of the portion of speech.

According to another aspect of the invention, a speech recognition system is provided which enables a user to enter a string of one or more characters as filtering information; means for enabling the user to edit the character string once entered; filtering means for responding to the entry and editing of the string by selecting a subset of machine responses associated with spellings which contain that string; and recognition means which favor the selection of acoustic models whose associated machine responses are in the subset selected by the filtering means.

In the preferred embodiment, the user can enter and edit the filtering string by voice. The system indicates one or more candidate filter strings to the user, enables the user to select one of the candidate strings, and uses the selected candidate string as the filtering string. The system selects the candidate filtering strings by speech recognition against the same portion of speech against which the recognition using the filtering is to be performed.

According to another aspect of the invention, a speech recognition system is provided which includes a language model for indicating the probability that a given word to be recognized will be each of a plurality of vocabulary words; recognition means for selecting which vocabulary word best matches a given spoken word to be recognized; and means for using the selection by said recognition means to update the statistical information in the language model. Preferably the language model is of the type that indicates word probabilities based on the language context of the word to be recognized.

DESCRIPTION OF THE DRAWINGS

These and other aspects of the present invention will become more evident upon reading the following description of the preferred embodiments in conjunction with the accompanying drawings, in which.

DETAILED DESCRIPTION OF PREFERRED EMBODIMENTS

Figure 1:
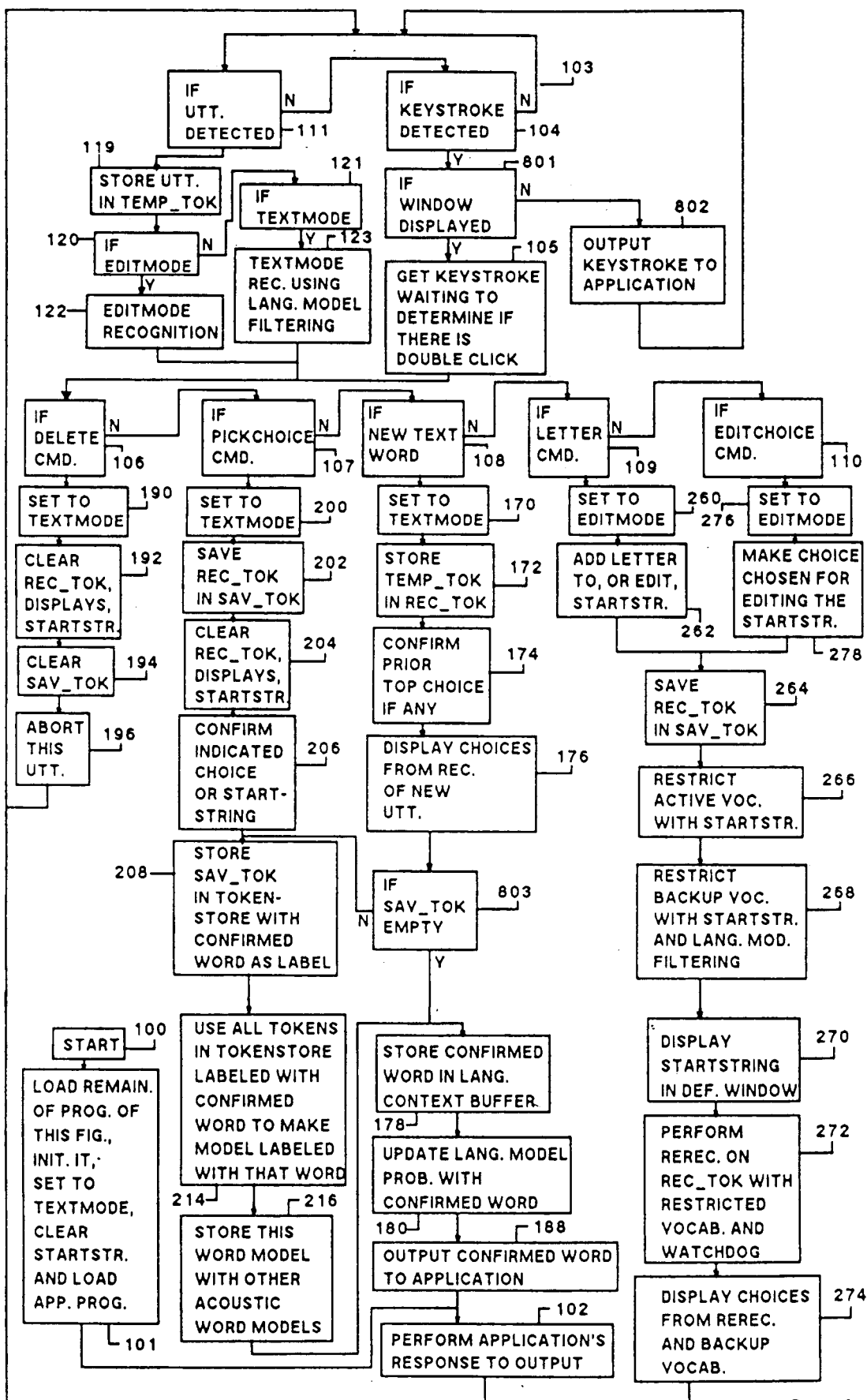
FIG. 1 is a schematic block diagram of the functional steps of a discrete utterance speech recognition system which embodies the present invention.

FIG. 1 is a schematic block diagram of the functional steps performed in a preferred embodiment of the present invention designed to recognize separately spoken words. By "word" in this context we mean an individual word or group of words which is spoken as a single utterance.

The preferred embodiment of the invention described with regard to FIG. 1 is designed to operate as a terminate-and-stay resident keyboard emulator. Such keyboard emulators are well known in the personal computer arts as programs which are loaded into memory and then exited, so that they can be called by an application program with which they are used every time that application program requests input from a keyboard. When such an application calls a subroutine to get input from the keyboard, the emulator takes over the call and performs the emulator's program rather than the operating system's standard keyboard processing routine. Then when the emulator is done, it returns to the application program, and if it produces any output, it produces that output as a string of characters in the same form as if those characters had been typed on a keyboard.

The program of FIG. 1 starts at 100, shown in the lower left hand side of that figure, by performing step 101. Step 101 initializes the system. It loads the remainder of the dictation program of FIG. 1 into memory; and it initializes that dictation program, including setting the recognition mode to TEXTMODE, which enables the first word dictated by the user to be recognized as a word to be entered into text; including clearing SAV_TOK, a buffer where a previously recognized word may be stored; and including clearing the string STARTSTRING, which is used for correcting mistakenly recognized words. Then step 101 exits the dictation program, leaving it resident in memory so that it can be called by the application program. Then it loads an application program and enters it at step 102. In the examples shown in this specification, the application program is a word processing program. But it should be clear that application programs besides word processors can be used with the dictation program of FIG. 1.

On the first entry into the application program in step 102, that program initializes and, once it is done initializing, it requests user input from the keyboard. This request causes the application program to, in effect, call the dictation program of FIG. 1, starting with input detection loop 103 shown at the top of FIG. 1. Loop 103 repeatedly performs step 111 which tests for an utterance detection and step 104 which tests for a keystroke detection. The program continues in loop 103 until either step 104 or 111 detects some user input. If a keystroke is generated, it is detected by step 104, and the test of step 801 is applied.

The test in step 801 is satisfied if the keyboard emulator is currently displaying a window (either a choice window or a definition window) to the user. That is, the test will be satisfied if either a choice window has been displayed by either step 176 or step 274, as is explained below, or a definition window has been displayed by step 270 and the display has not since been cleared by step 204 or step 192, as is explained below. If the test of step 801 is not satisfied, then the keystroke is sent directly to the application as is indicated by step 802. When the application completes responding to this keystroke in step 802, it returns control to the loop 103 at the top of FIG. 1 to wait for the next input from the user. In this mode the user can type normally, as if no speech recognition were being used.

If the keyboard emulator is displaying a window and thus the test in step 801 is satisfied, it causes step 105 to get the keystroke, and to supply it for use in the sequence of branching tests represented by steps 106–110. The step 105 includes substeps which cause the program to wait briefly, if the keystroke received is a function key "f1" through "f9", for a specified double-click period, such as a third of a second, to see if the user presses the same function key again. If he does, the keystroke is interpreted as a double click associated with the same number as the twice pressed function key, and a character representing both the number of the function key pressed and that fact that it was pressed twice is sent to the tests of steps 106–110.

If, on the other hand, the user speaks an utterance, it is detected by the step 111, and a token is made of the utterance and speech recognition is performed upon it.

Figure 2:
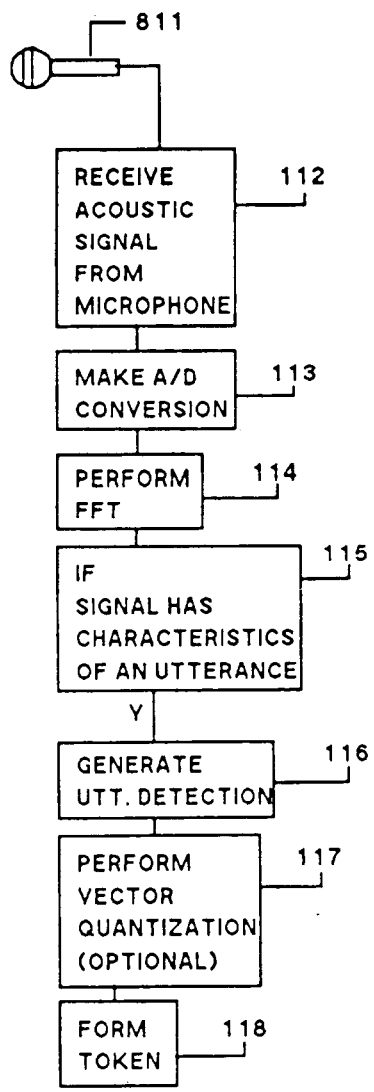
FIG. 2 is a flow chart of the functional steps used in the acquisition of new acoustic tokens for use in the speech recognition systems of FIGS. 1 and 25.

Referring now to FIG. 2, the steps which produce a token in response to each utterance spoken by the user will be described. In the preferred embodiment, most of the steps of FIG. 2 are performed by hardware other than the CPU which performs the steps of FIG. 1, so that the steps of FIG. 2 can be performed in parallel with those of FIG. 1.

When the user speaks an utterance into the microphone 811, it causes a step 112 to receive an acoustic signal from that microphone. Actually the step 112 is constantly receiving an acoustic signal from the microphone, as long as that microphone is on, which it normally is when the user is using the system for dictation. As a result, the steps of FIG. 2 should be viewed as the steps of a pipe-lined process which are performed in parallel. The analog electrical signal from microphone 11 received by step 112 is converted to a sequence of digital samples by the analog-to-digital conversion step 113. A fast Fourier transform step 114 is used to compute a magnitude spectrum for each frame of speech. Methods for computing a magnitude spectrum from a sequence of digital samples are well-known to those skilled in the arts of digital signal processing. In a preferred embodiment of the present invention, the A/D conversion 113 samples at 12,000 Hertz, creating 240 digital samples during a 20 msec speech frame. The 240 digital samples are multiplied by an appropriate window function, such as a Hamming window and then the FFT 114 is performed to compute a frequency spectrum. Other methods of digital signal processing, such as linear predictive coding (LPC) and other acoustic parameterizations such as cepstral coefficients may be used just as well.

After the magnitude spectrum has been computed by the FFT 114, a test is performed in step 115 to determine if the sound currently being received by the microphone and transformed by the FFT appears to be the start of an utterance. Although there are many ways of detecting utterances known in the art of speech recognition, in the preferred embodiment of the invention, step 115 considers an utterance to have started when the FFT output indicates that the audio signal has been above a relatively loud volume for 3 frames. If the user places his mouth relatively close to the microphone 111, his utterances will be substantially louder than most other sounds detected by the microphone, except relatively brief sounds such as bangs, or inadvertent brief sounds made by the user. As a result, this simple method of utterance detection works fairly well.

If step 115 detects an utterance, step 116 generates an utterance detection flag, which remains set until step 111 of FIG. 1 next tests that flag. If an utterance is detected, step 118 forms a token of it. In the preferred embodiment this token consists of a sequence of all frames produced by the FFT 114, starting sixteen frames before the frame at which the utterance detection was generated, and continuing through to the frame at which the FFT indicates the amplitude of the signal has been below a threshold level associated with background noise for approximately a quarter second. This sequence of frames is the token representing the utterance.

It should be understood that vector quantization step 117 may optionally be used in the formation of tokens. That is, some successful speech recognition systems use vector quantization to compress the data required to represent the information produced by the FFT for each frame. Other systems do not. The present invention can work well with either form of acoustic analysis. As is well-known to those skilled in the arts of digital signal processing, the vector quantization step 117 consists of matching the spectral magnitude vector for the current speech frame against a code book of sample spectra. The vector of spectral magnitude values is then replaced by a single number, namely the index in the code book of the best matching sample spectrum. In step 118 a token is formed either by forming an array from the sequence of spectral magnitude vectors (if vector quantization was not used in step 117) or by forming a sequence of vector quantization indices for the sequence of speech frames.

Returning now to FIG. 1, when step 111 detects an utterance, it causes the program to advance to step 119, which stores the token produced by step 118 of FIG. 2 in a memory buffer called TEMP_TOK, which is short for "temporary token". The tests of steps 120 and 121 determine if the keyboard emulator's recognition mode has been set to EDITMODE or TEXTMODE. If the recognition mode has been set to EDITMODE, step 120 causes step 122 to perform EDITMODE speech recognition on the token stored in TEMP_TOK. If, on the other hand, the recognition mode has been set to TEXTMODE, step 121 causes step 123 to perform TEXTMODE recognition upon TEMP_TOK. TEXTMODE recognition is the normal recognition mode which enables the user to dictate words for inclusion in the textual output of the system. It uses a vocabulary which contains all the text words 124 for which the system has acoustic models (shown in FIG. 3). The current embodiment of the invention can have a recognition vocabulary of over five thousand text words once acoustic models for these words have been trained. In addition the TEXTMODE vocabulary contains menu selection commands 125, such as "pick_one", "pick_two", etc., edit menu choice commands 126, such as "edit_one", "edit_two", etc, and letter commands 127, such as "starts_alpha", "starts_bravo", etc, (shown in FIG. 3) which are used to edit mistakenly recognized words, as is explained in greater detail below. EDITMODE recognition uses a much smaller active vocabulary including the menu selection commands 125, edit menu choice commands 126, and a simplified version of the letter commands 127, such as "alpha", "bravo", etc., but not including the large vocabulary of text words 124.

Figure 3:
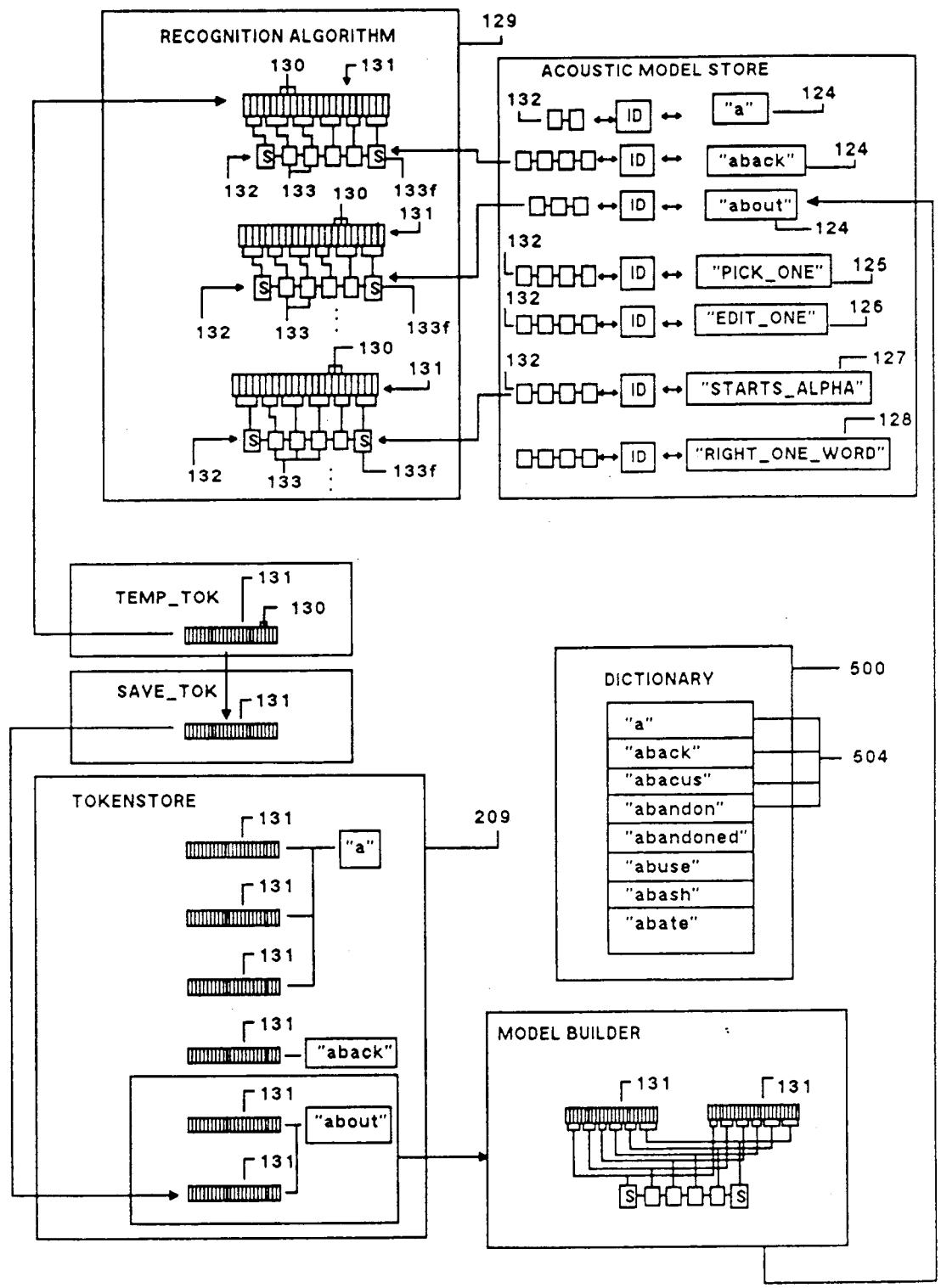
FIG. 3 is a schematic block diagram of the recognition algorithm and related data structures used in the embodiment of the invention shown in FIG. 1.

Except for their different active vocabularies, TEXTMODE and EDITMODE use the same recognition algorithm 129, which is shown in a simplified graphical form in FIG. 3. As FIG. 3 indicates, this algorithm compares the sequence of individual frames 130 which form the TEMP_TOK 131 with each of a plurality of acoustic word models 132. The preferred embodiment uses dynamic programming that seeks to time align the sequence of individual nodes 133 of each word model 132 against the sequence of frames 130 which form TEMP_TOK in a manner which maximizes the similarity between each node of the word model and the frames against which it is time aligned. A score is computed for each such time aligned match, based on the sum of the dissimilarity between the acoustic information in each frame and the acoustic model of the node against which it is time aligned. The words with the lowest sum of such distances are then selected as the best scoring words. If language model filtering is used, a partial score reflecting the probability of each word occurring in the present language context is added to the score of that word before selecting the best scoring word, so that words which the language model indicates are most probable in the current context are more likely to be selected.

Figure 4:
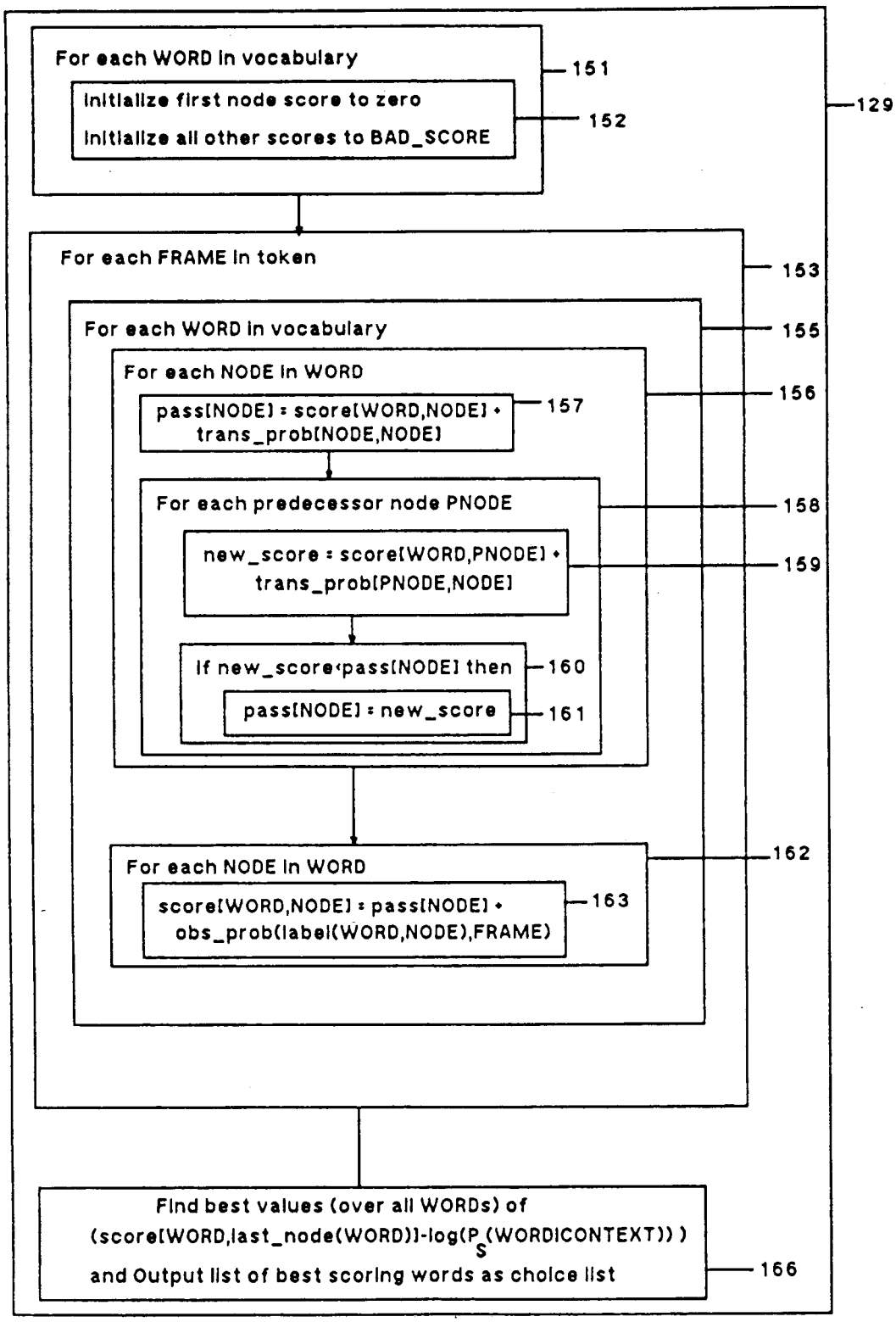
FIG. 4 is a schematic block diagram of the functional steps performed in a well-known discrete utterance recognition algorithm which uses hidden Markov models and which is used as the recognition algorithm in the embodiment of FIG. 1.

Referring now to FIG. 4, a much more detailed description of the speech recognition algorithm 129 used in the preferred embodiment is illustrated. This algorithm uses the method of hidden Markov models. As is well-known to those skilled in the arts of automatic speech recognition, the hidden Markov model method evaluates each word in the active vocabulary by representing the acoustic model 132 (shown in FIG. 3) for each word as a hidden Markov process and by computing the probability for each word of generating the current acoustic token 131 (shown in FIG. 3) as a probabilistic function of that hidden Markov process. In the preferred embodiment of this invention, the word scores are represented as the negative logarithms of probabilities, so all scores are non-negative, and a score of zero represents a probability of one, that is, a perfect score.

The first step 151 of the matching routine of FIG. 4 is to initialize the scores to represent the state of the Markov models at the beginning of the token. That is, for each word in the vocabulary, initialization step 152 is performed. In step 152, the score of the first node 133 (shown in FIG. 3) of each word model is set to zero (indicating that the probability is one that the Markov process is in the first node). The score of every other node 133 is set to BAD_SCORE, a large positive number (essentially corresponding to a probability of zero) such that any node with a score of BAD_SCORE is threshold as being an impossible event.

The main matching process is then performed by step 153, which executes step 155 for each frame 130 (shown in FIG. 3) of the token. Step 155, in turn, performs the two steps 156 and 162 for each word in the active vocabulary.

For each node in a given word, step 156 performs the two steps 157 and 158. In step 157 a score, pass[NODE], is computed for the event which corresponds to the Markov process having already been in the current NODE during the previous frame and remaining in the current NODE for the current FRAME. That is, score[WORD,NODE] is the score of the current NODE up through the previous frame, and trans_prob[NODE,NODE] is (the negative logarithm of) the probability of a Markov transition from NODE to itself.

Step 158 then computes a score for each path to the current NODE from any legal predecessor node, PNODE. A predecessor node is a node from which there is a non-zero probability of a transition to the current NODE. For each predecessor node, PNODE, step 158 performs steps 159 and 160. Step 159 computes the score of the event consisting of the Markov process having been in node PNODE for the previous frame and of transitioning to node NODE for the current frame. Step 160 then compares this new_score with pass[NODE], which was first computed in step 157. If new_score is better than pass[NODE], then step 161 sets pass[NODE] to new_score. That is, as each path to the current NODE is considered, pass[NODE] is always updated to represent the best score for any path leading to the current NODE for the current FRAME.

After step 158 is completed for each predecessor PNODE, and step 156 is completed for each NODE in the current WORD, step 162 is iterated for each NODE in the current WORD. Step 162 is executed as a separate loop because it over-writes the array score[WORD,NODE], so it must wait until step 156 has finished using the array score[WORD,NODE] before it begins to over-write it. For each NODE of the current WORD, step 162 executes step 163. Step 163 takes the score pass[NODE] and adds the score for the current FRAME for which step 153 is being iterated.

The function label(WORD,NODE) used in step 163 allows a variety of styles of word models to be used within the hidden Markov model methodology described in FIG. 3. As is well-known to those skilled in the art of automatic speech recognition, there are two main classes of word models used in hidden Markov modeling and in other automatic speech recognition methods based on dynamic programming: whole word models and phoneme-based models of the type which are described in greater detail below with regard to FIG. 8. It is also possible to use more elaborate models such as phoneme-in-context which can be a combination of simple phoneme models and whole word models. Step 163 can accommodate any of these methods by the appropriate choice of the function for label(WORD,NODE). For whole word models, label(WORD,NODE) returns a unique value for each NODE of each WORD. For phoneme-based models, label(WORD,NODE) returns the same value whenever the same phoneme is shared by two or more words. For phoneme-in-context models, label(WORD,NODE) returns a value uniquely determined by the current phoneme and its context.

There is also a separation of speech recognition systems based on whether a vector quantizer is used, as described in the discussion of FIG. 2. Systems which use vector quantization are called discrete-alphabet systems, while systems that do not use vector quantization are called continuous-parameter systems. The function obs_prob(label(WORD,NODE),FRAME) in step 163 allows the preferred embodiment of the present invention to be used as either a discrete-alphabet system or as a continuous-parameter system. If a discrete-alphabet is used, then the function obs_prob(label(WORD,NODE),FRAME) becomes simply a table lookup in an array, where the first index is the value of label(WORD,NODE) and the second index is the vector quantizer label for the current FRAME. In a continuous parameter system, each value of label(WORD,NODE) is associated with a parametric probability distribution for the vector of acoustic parameters. For example, the vector of acoustic parameters may be modeled as a multi-variant Gaussian distribution. The function obs_prob(label(WORD,NODE),FRAME) then computes the negative logarithm of the probability of the vector of parameters associated with the current FRAME for the parametric probability distribution which is associated with the current value of label(WORD,NODE).

In any case, step 163 computes the negative logarithm of the probability of the current FRAME for the current NODE. This observation score is added to pass[NODE] and the sum is stored in score[WORD,NODE], representing the score of the best path leading to the current NODE for the current FRAME.

In the preferred embodiment, each word model has a special final node, last_node(WORD), (133f in FIG. 3), corresponding to the silence (or background noise) at the end of the discrete utterance. These extra nodes allow for the possibility that, near the end of the observed utterance, for some words the best (most probable) interpretation may be that the word has already been completed, while for other words the best interpretation may be that the Markov process is still in a state corresponding to a low energy speech sound, such as a stop or fricative. Having an extra node in each word model allows the ending time decision to be made separately for each word.

Figure 9:
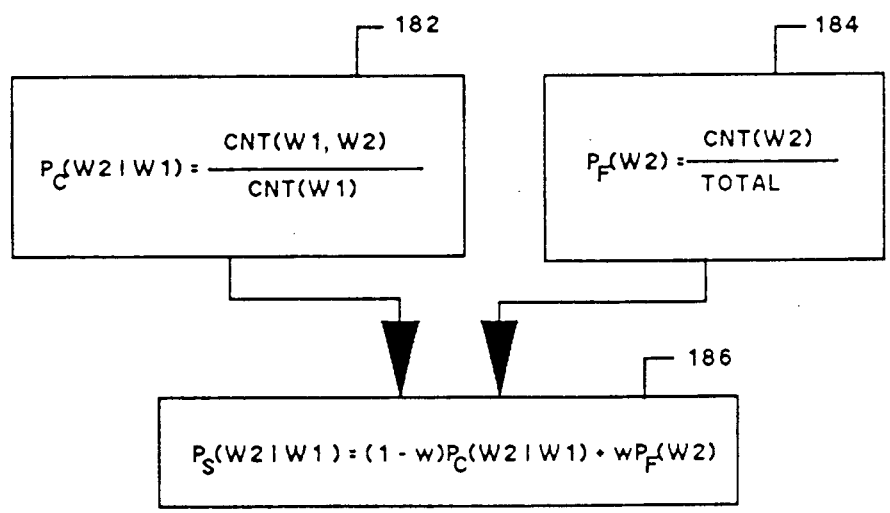
FIG. 9 is a flowchart of the probabilistic natural language modeling process used in the embodiments of FIG. 1 and 25.

Step 162 completes the steps which are done for each word of the vocabulary to make up step 155. Step 155 completes the steps which are done for every FRAME in the token to make up step 153. After step 153 has been iterated for every FRAME of the token, step 166 outputs the "choice list", which consists of the best scoring word and the 8 next best scoring alternate word choices. After step 153 has been done for every FRAME of the utterance, score[WORD,last_node(WORD)] for a given word will be the score for the hypothesis that the word has been complete and that the Markov process is in the special final node corresponding to the silence after the word. Step 166 adds the language model score for each WORD to the final score of the last node of the WORD. That is, step 166 chooses the words to be put on the choice list by comparing the values of the expression (score[WORD,last_node(WORD)]−log($P_s$(WORD|CONTEXT))     ), where $P_s$ is the language model probability as computed in FIG. 9, for each of the words in the active vocabulary, and, by techniques well-known to those skilled in the arts of digital computing, selecting the words with the nine best scores. In the preferred embodiment a threshold is set such that any word with a score corresponding to a probability less than $2^{-16}$ will not be displayed (normalizing the word probabilities to sum to one). Usually less than 9 words will satisfy this criterion, so less than 9 words will be displayed. This step completes the preferred embodiment of speech recognition algorithm 129 for discrete utterance recognition.

Although the match routine 129 has been described with regard to a particular embodiment, many variations on the basic routine described in FIG. 4, are well-known to those skilled in the art of automatic speech recognition. This invention is compatible with many such variations. In particular, this invention is compatible with variations which may be used to improve the efficiency of large vocabulary speech recognition. For example, to reduce the amount of computation, various thresholding schemes may be used so that the match routine 129 need only evaluate the best scoring nodes for each frame. The present invention would work perfectly well with such thresholding schemes, because the same hidden Markov models would be used, merely fewer nodes would be evaluated.

Another variation on the embodiment of FIG. 4 would be to normalize the scores so that the computation could be done in 16-bit integer arithmetic. Still another variation of the embodiment of FIG. 4 replaces step 160 by a combine-score routine that sets pass-[NODE] to the logarithm of the sum of new_score and pass[NODE]. Again, the present invention would work with such variations.

Other variations of the basic match routine of FIG. 4 which improve the efficiency for large vocabulary speech recognition include a rapid-match or prefilter stage which quickly eliminates all but the most likely word candidates, or a lexical retrieval stage which hypothesizes word candidates bottom-up from acoustic evidence. Among such variations, the present invention is compatible with those that allow their associated acoustic models to be built incrementally as individual words are added to the vocabulary.

It also will be seen, in the discussion below of FIG. 5A, that the present invention is compatible with an alternate embodiment of the recognition algorithm 129 that is designed for connected and continuous speech, as will be explained in greater detail with regard to the embodiment of the invention disclosed in FIG. 25.

Returning now to FIG. 1, once the speech recognition routine called in either the EDITMODE or TEXTMODE recognitions of step 122 or step 123, respectively, has selected a best scoring word and a list of the next best scoring words, the corresponding machine response, which in the embodiment of FIG. 1 is a string of one or more characters, associated with that best scoring word is supplied to the branching tests represented by the steps 106-110, just as is any keystroke input supplied by the user (if a choice window is displayed by the keyboard emulator so the test in step 801 is satisfied).

If the user's input is an utterance recognized as a text word, its associated machine response, or output, is a string of printable ASCII characters representing the spelling of its associated word preceded by a special character which serves no purpose except to distinguish single letter text words from letter commands. When this machine response is supplied to the sequence of tests comprised of steps 106-110, the test of step 108 will be satisfied and the program will advance to the branch which starts with step 170. The test of step 108 will also be passed if step 123 fails to find any best choice in response to an utterance. It is assumed that any untrained words spoken by the user when using the program of FIG. 1 are text words, since it is assumed that before the user attempts to speak any of the commands whose outputs meet the tests of steps 106, 107, 109, or 110, he or she will have trained proper models for those commands using traditional acoustic model training techniques.

If the test of step 108 is passed, the program advances to step 170. Step 170 sets the recognition mode to TEXTMODE, since the system assumes that after a user dictates one text word, his next utterance may well be another text word. Then step 172 saves the token saved in TEMP_TOK by storing it in a buffer named REC_TOK, which is short for "recognized utterance". This is done so that if the user utters a spoken command to rerecognize the token formerly stored in TEMP_TOK, it will be available for such rerecognition and will not be lost due to having been over written by any such spoken command.

Next step 174 confirms the top choice, or best scoring word, from the recognition or rerecognition of the previous text word, if any, displayed at the time the token just saved in REC_TOK was uttered. Then step 176 erases the prior display and displays the choices from the recognition of the token just saved, with the choices displayed in order, with the top choice, or best scoring word, first, and with each choice having next to it a function key number, "f1" through "f9". This display is made in the form of a pop-up active window display 701 shown in FIGS. 10-22. Of course, when the program of FIG. 1 is first entered, there is no current active window display 701, because there has been no previous recognition, and thus no top choice to confirm.

In the preferred embodiments, word choices are displayed by means of pop-up windows, such as active window 701, because the preferred embodiments are designed to be used as a voice keyboard in conjunction with application programs which have their own screens. It should be understood, however, that in other embodiments of the present invention other methods of presenting the recognition choices could be easily implemented by those skilled in the arts of interactive computing systems. For example, if the system was designed for situations in which the operator is performing some task (such as viewing through a microscope) which prevents the operator from viewing a computer display screen, the choice list can be presented in spoken form using synthetic speech. Such synthetic speech could also be used by a visually impaired user.

Once step 176 has displayed the best scoring words, the program advances to step 803 which tests whether SAV_TOK is non-empty. SAV_TOK will hold a previously recognized word which is now being confirmed by test 108, if step 264 has been executed since the last time that either step 194 or step 216 has been executed. If SAV_TOK is not empty, the program goes to step 208, explained below. If SAV_TOK is empty, the program advances to step 178, which stores the top word choice confirmed in step 174, if any, in the language context buffer. In the embodiment of FIG. 1, this buffer stores the last two confirmed words. If the system is to be used with word processors or other applications that let a user move around a body of text and insert words other than in a sequential manner, it is desirable that means be provided to indicate to the system that the next word to be dictated is not to be located after that last word recognized by the language model. Upon such an indication the language context buffer can be cleared or have its contents set to the values of two words immediately preceding the location in the body of text at which the next dictated word is to be inserted. If the language context is cleared, the language model will base its score only on the context independent probability of words being spoken.

After step 178 stores the confirmed word, if any, in the language context buffer, step 180 uses the confirmed word, if any, to update the language model used by the recognition system. Several such language models are well-known to those skilled in the art of natural language speech recognition, and this invention would work with any of them. In the preferred embodiment, the language model is a probabilistic language model based on the counts of word bigrams, as shown in more detail in FIG. 9. That is, for each pair of words W1 and W2, statistics are kept of how often the pair occurs as successive words in the text. During recognition, where W2 is the word to be recognized and W1 is the most recently confirmed word stored in the language context buffer, the probability of W2 is estimated as the number of counts for the pair W1, W2 divided by the total number of counts for W1, as shown at step 182.

A context-free probability is also estimated, as shown at step 184. The context-free probability of W2 is simply the number of counts of W2 divided by the total number of counts.

In step 186, the context-dependent probability estimate and the context-free probability estimate are combined into a smoothed context-dependent estimate, by adding the two probability estimates, giving a weight of $(1-w)$ to the context-dependent estimate and a weight of w to the context-free estimate. This smoothing allows for words that have never occurred before in the context of a particular W1. A typical value for w in the preferred embodiment would be $w=0.1$, but w may be empirically adjusted by the user to optimize performance based on the amount of training text available for estimating the context-dependent model. If more text is available, a smaller value of w may be used.

When step 180 updates the language model, it uses the most recent confirmed word stored in the language context buffer to update the count of both W2 and the total count used in the probability calculation of steps 182, 184, and 186. It also uses the second most recently confirmed word as the value of W1 in the steps 182 and 186, and as the value of CONTEXT in step 166 of FIG. 4.

After the language model has been updated in step 180, the program advances to step 188 which produces the confirmed word as an output to the application program that the keyboard emulator dictation program of FIG. 1 is being used with. It produces this output as a string of ASCII characters, as if those characters had been typed on the keyboard of the system's computer. As those skilled in the art of terminate-and-stay-resident programs will understand, it accomplished this in a manner which is a too complicated to fit onto FIG. 1. Actually step 188 returns only the first character of the output string to the application program and places the rest in an output buffer. Then each subsequent time the application calls the dictation program for input until the output string is empty, that program, instead of advancing to the polling loop 103 at the top of FIG. 1, merely returns with the next character of the output buffer. For purposes of simplification, however, in the remainder of this specification step 188 and its corresponding 188a in FIG. 25 are treated as if they output the entire string at one time. In the preferred embodiment, step 188 and the corresponding step 188a of FIG. 25 also apply punctuation rules that put spaces between words and capitalize the first word of a sentence.

Once step 188 is performed, the keyboard emulating dictation program returns to the application program to enable the application program to respond to the output string, if any, as is indicated by step 102. In the example shown with regard to FIGS. 10-23, the application program is a word processor which represents and can edit a body of text, and which has a cursor 700 which indicates where in the body of text the next input from the user will be inserted. Thus in step 102 the word processor inserts any output string supplied by step 188 into its text at the current cursor location as if that string had been typed in by keyboard.

Once the application program has handled all the characters in the output string, it requests the next keystroke. This causes the program flow again to return to the polling loop 103 at the top of FIG. 1. Loop 103 polls for the user's next input. If it is a keystroke and the dictation program is displaying a window, steps 104 and 105 fetch it. If it is an utterance, steps 111, 119 and either 120 and 122 or 121 and 123 recognize it. In either case the program then again advances to the branching test of steps 106-110.

If the user input consisted of a delete command in the form of the pressing of the "delete" key or an utterance recognized as "delete_utterance", the test of step 106 will be satisfied, and the dictate program will advance to the program branch starting with step 190. The delete command is designed to let the user indicate that the last utterance recognized as a text word for which an active window display 701 is shown, should be abandoned and erased from the system. This command is often used if the recognizer mistakenly treats an inadvertent sound made by the user or a background sound as an utterance. It also may be used if the user decides to replace the last word he dictated with another word.

Step 190 sets the dictation program to TEXTMODE, since it assumes that after a delete command the next word the user enters will be a word to be entered into text. Then step 192 clears REC_TOK, to indicate that no further rerecognition is to take place upon the token formerly stored in that buffer. Step 192 clears the STARTSTRING so that it will be empty the next time the user decides to employ it. It also clears all pop-up windows which the keyboard emulating dictation program has placed on the computer's screen. Next step 194 clears a buffer named SAV_TOK, which is short for "saved_token", to indicate that the utterance in REC_TOK and SAV_TOK should not be used to make training utterances or to train word models in steps 208 and 214, described below. Then step 196 aborts the current utterance for which a window 701 was displayed. It does this by returning to loop 103 at the top of FIG. 1 for the user's next input.

If, when the dictation program advances to the tests of steps 106-110, the input detected from the user corresponds is a valid pick-choice command, the test of step 107 is satisfied, and the branch of the program beneath that step is performed. The valid pick-choice commands consist of any of the function keys "f1"-"f9" or any of the voice commands "pick_one" through "pick_nine" which correspond to the number of a word choice displayed in either the active window display 701 or the Dictionary Window 702 (See FIGS. 10-23). Such commands are used to indicate that a word having a given number "f1" through "f9" in either the window 701 or 702 is the desired word for the utterance associated with that display.

If the user does enter a pick-choice command, step 107 branches the program to step 200. Step 200 sets the recognition mode to TEXTMODE, since it is assumed that after the user confirms a given word choice he or she may want to enter another text word. Then step 202 causes the token currently in REC_TOK, which represents the utterance associated with the word choice the user has picked, to be saved in SAV_TOK. As is explained below, this will cause that token to be used in the training of an acoustic word model 132 (shown in FIG. 3) of the word the user has picked. Next Step 204 clears REC_TOK to indicate that no further rerecognition is to take place on the token formerly stored there. It also clears STARTSTRING and any pop-up windows on the screen. Then Step 206 confirms the word choice having the number associated with the pick-choice command the user has just entered.

After this is done the program advances to steps 208, 214, and 216, which all relate to using the token associated with the utterance of the word just confirmed to train up acoustic models of that word. Step 208 causes the token 131 stored in SAV_TOK, if that buffer is not empty, to be stored in a tokenstore 209 (shown in FIG. 3) in association with the word 210 just confirmed by the pick-choice command, and then clears SAV_TOK. Step 214 finds all the tokens previously stored in the tokenstore in association with the just confirmed word and builds a new acoustic model for that word with those tokens (as is indicated in the lower right hand corner of FIG. 3). Step 216 stores this acoutic word model with the other acoustic word models used by the system's recognizer (as is indicated by the arrow leading from the model builder to the acoustic model store in FIG. 3)

The saving of tokens associated with confirmed words and the use of multiple tokens saved in conjunction with the confirmed word performed by the program of FIG. 1 provide an effective and efficient means of adaptive speech recognition. This method only saves tokens for utterances when the user specifically confirmed the word to be associated with that utterance by means of a pick-choice command. This lets the user greatly reduce the chance that an incorrectly recognized utterance will be used to train models of the wrong words. It also tends to greatly reduce unnecessary training, since normally the pick-choice command is only used to pick words other than the top-choice, and thus it reduces the likelihood that the system will replace word models that are producing correct recognition. It is true that a user, by pressing "f1", can use a pick-choice command to pick the top choice in an utterance's first recognition (that performed in step 123). But normally the user will not, since it is much easier to confirm such an initial top choice merely by speaking another text word, which will cause the branch of programming under step 108 to be performed.

The use of multiple tokens to train word models in an adaptive environment is very useful. Traditional adaptive training techniques usually involve taking data from one new token of a word and using it to modify the parameters of a previous model of that word. This adding of data from a new token into an old model often causes the new data to be applied in a way which gives it less weight than if a model were trained from several tokens including that new token all at one time.

The acoustic tokenstore used with the embodiment of FIG. 1 is a circular buffer of tokens which contains the 50 most recently saved tokens. In alternate embodiments, an even larger circular buffer could be used. In the preferred embodiment, if there is only one new token available for a particular word, then traditional adaptive training is used. That is, the data from the new token is averaged with the data of the old model.

As is well-known to those skilled in the art of hidden Markov model speech recognition, training or model building can be done using dynamic programming routines which are very similar to the recognition match routine 129 described above with regard to FIG. 4. A schematic block diagram of such a dynamic programming training routine is given in FIG. 5. The dynamic programming analysis is broken into two phases. Step 218 is a forward scoring routine similar to the discrete utterance match routine shown in FIG. 4. This forward scoring pass incrementally computes the best paths through the Markov models, for all partial utterances. The second phase, step 220, traces back through the partial paths which were computed during the forward scoring to find the globally best path. When used in the training of discrete word models, this globally best path is the path through the entire word chosen by the dynamic programming, and it associates successive groupings of one or more frames 130 from each training utterance of the word with the successive nodes 133 of the word model 132 being built, as in FIG. 8.

The block diagram shown in FIG. 5 may be applied to either building acoustic models, as is performed in step 214 of FIG. 1, or, as will be explained in greater detail below, with the slight modification shown in FIG. 5A it can be applied as a match routine for connected or continuous speech.

Figure 6:
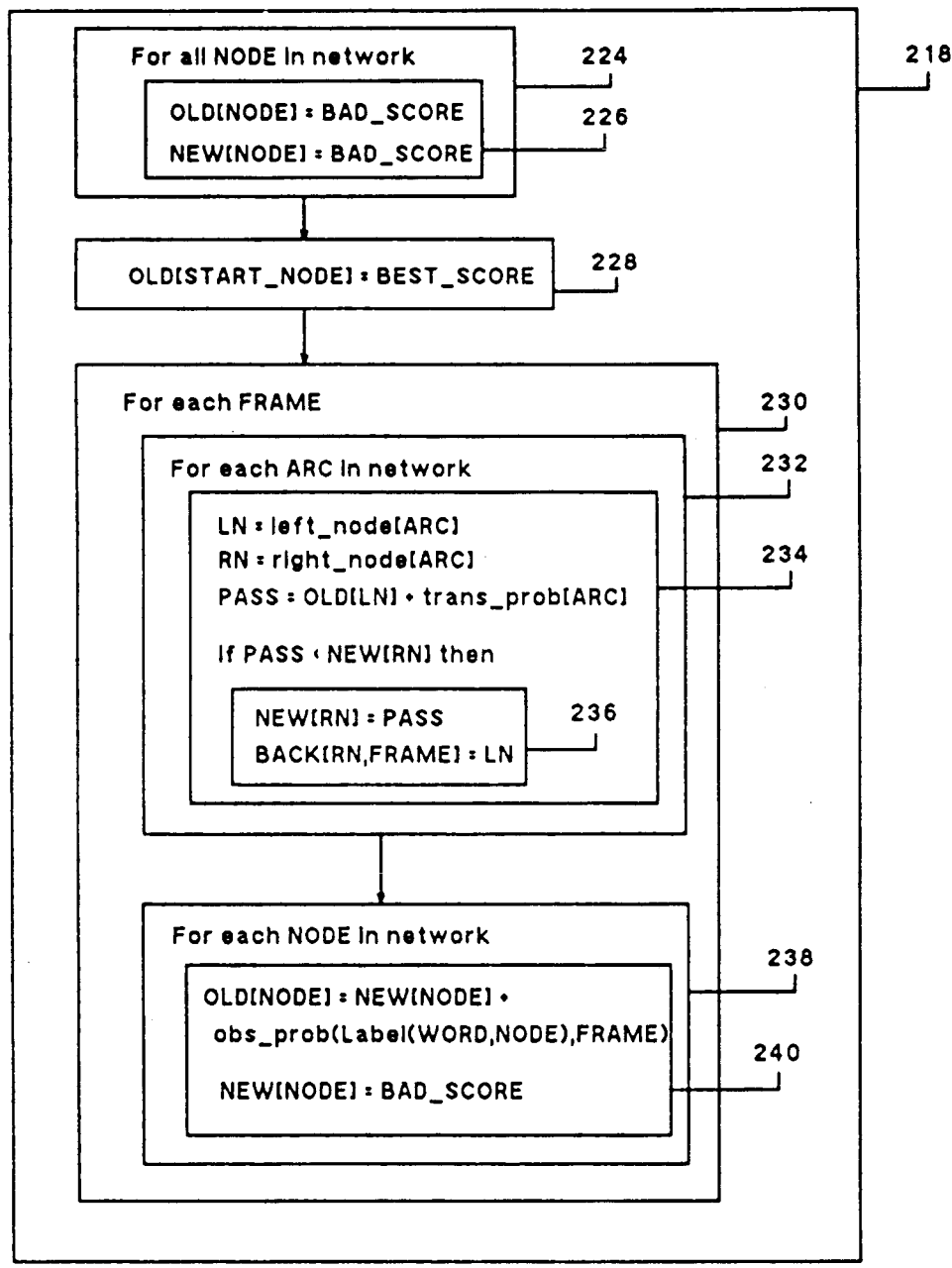
FIG. 6 is a schematic block diagram of the forward pass of the well-known method of dynamic programming applied as the first step of training acoustic models or of continuous speech recognition.

The forward scoring step 218 is shown in more detail in FIG. 6. First, in step 224, each node is initialized (step 226) to BAD_SCORE, which corresponds to a probability of zero. The array OLD[NODE] holds the scores from the previous FRAME, while the array NEW[NODE] holds scores being computed for the current FRAME. In step 228, the START_NODE is initialized to BEST_SCORE which, in the preferred embodiment, would be zero, representing a probability of one that the process starts in state START_NODE.

The loop of Step 230 is then iterated for each FRAME in the utterance. For each FRAME, the loop of step 232 is iterated for each ARC in the network. For each ARC, step 234 takes the OLD score for the left-hand node of the ARC and adds the Markov transition probability score for the particular ARC. Since the scores are negative logarithms of probabilities, adding scores corresponds to multiplying probabilities. The PASS score which has been computed as this sum is compared with the NEW score for the right-hand node for the current ARC. If the PASS score is better, step 236 uses it to replace the NEW score for the right-hand node, and stores traceback information in the array BACK. Thus for each NODE, NEW[NODE] will eventually have the score of the best path leading to NODE for the current frame, and BACK[NODE, FRAME] will identify the node which in the previous FRAME was the node on that best path.

After Step 232 is completed for each ARC in the network, the loop of step 238 is iterated for each NODE. For each NODE, step 240 adds the observation probability score. This observation probability score is the same as discussed in step 163 of FIG. 4. Step 240 also re-initializes the array of NEW scores to BAD_SCORE.

Figure 5:
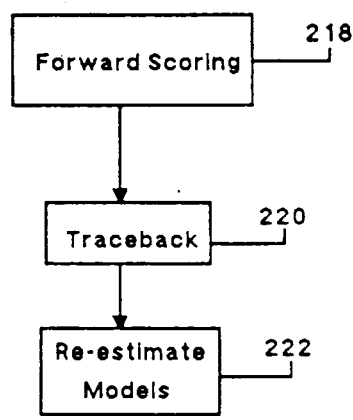
FIG. 5 is a schematic block diagram of the functional steps involved in the training or building of acoustic models for a hidden Markov model which is used in the recognition systems of FIGS. 1 and 25.
Figure 7:
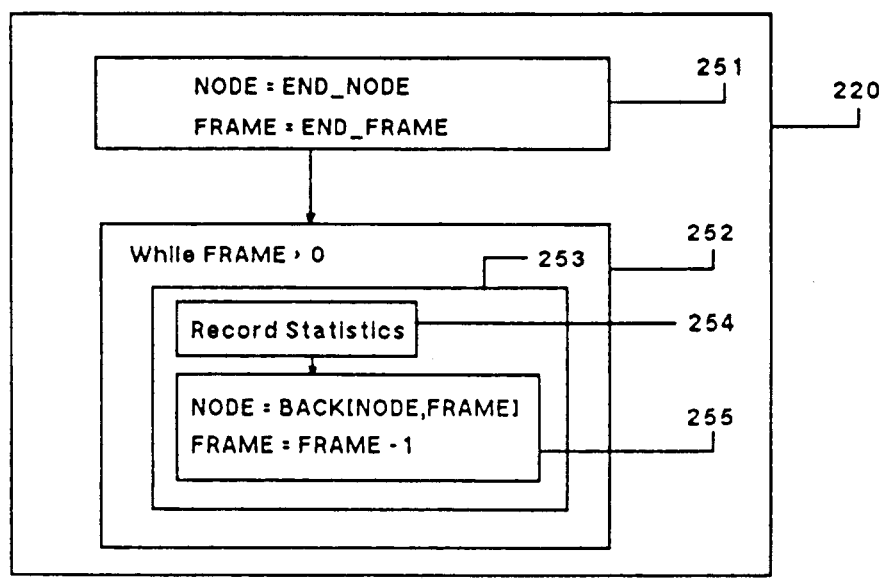
FIG. 7 is a schematic block diagram of the traceback step for training acoustic models or for continuous speech recognition.

Step 220 of FIG. 5 is shown in more detail in FIG. 7. It traces back through the best path which leads to END_NODE at the end of the utterance, END_FRAME. Step 251 starts the trace back at NODE END_NODE and FRAME END_FRAME. Step 252 then traces back until getting to the start at FRAME=0. For each frame tracing backwards, step 253 is executed.

Step 253 consists of two parts. In step 254, statistics are recorded. In step 255 the variable NODE is set equal to BACK(NODE,FRAME), the node the time alignement of the forward pass 218 associated with the frame preceding the current frame FRAME, and then the current FRAME is set equal to what had been the frame preceding the current frame.

When step 220 is being used in acoustic model building (step 214 of FIG. 1), the statistics to be recorded are acoustic parameters of the current FRAME (which will be a vector of parameters if vector quantization is not used in step 118 of FIG. 2, but will be just an index into the code book if vector quantization is used), associated with the conditional probability distributions for the label(WORD,NODE) of the current NODE of the WORD being trained.

In step 222, the models are re-estimated using a variation of the well-known Baum-Welch algorithm, or more generally using the EM algorithm, which is well-known to those skilled in the arts of statistics and, more particularly in the art of hidden Markov modeling. The re-estimation essentially consists of a maximum likelihood estimation of the statistical parameters which characterize the probability distributions. If the system has existing models for the word or phonemes for which a new model is being built and there is only one token for the word in the tokenstore, then the accumulated statistics from previous training are combined with the statistics from the token in the acoustic token stored used in step 214 to make a combined maximum likelihood estimate of the statistical parameters. As is well-known to those skilled in the art, this operation will allow adaptive training of the acoustic models, as well as zero-based training if no previous model exists.

Figure 8:
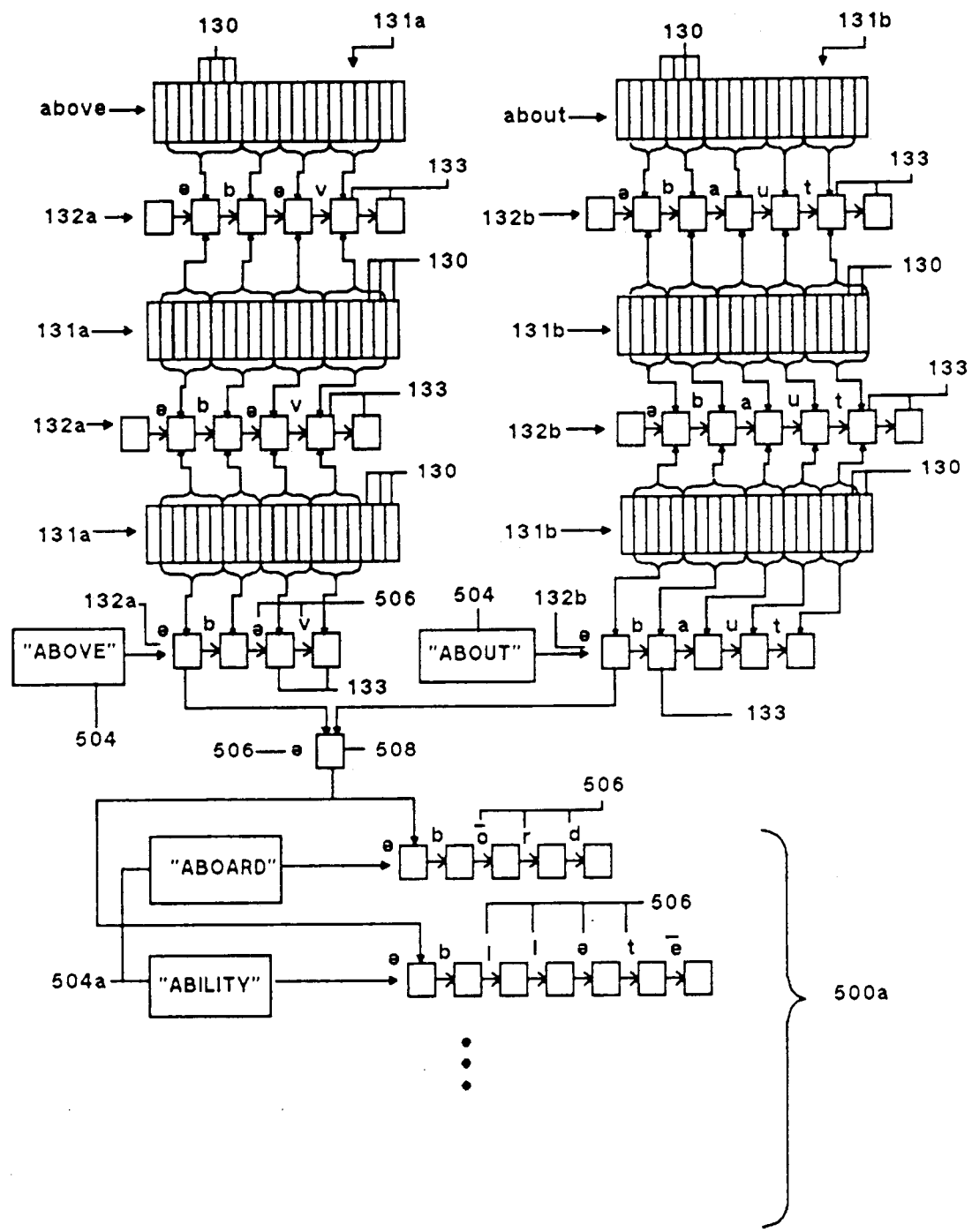
FIG. 8 is a schematic diagram of acoustic model training of the type described in FIGS. 5, 6, and 7, which also shows how data derived in such training can be used to train phonemic word models.

Referring now to FIG. 8, a very simplified schematic representation of the training algorithm just described is shown. In it the acoustic descriptions 131a and 131b of the spoken words "above" and "about", respectively, are used to train acoustic word model 132a and 132b of those words. For the initial pass of the model building, if no previous model existed for the word, an initial model could be used which is comprised of a desired number of nodes produced by dividing the frames 130 of each acoustic description, such as the token 131a, into a corresponding number of essentially equal sized groupings, and then calculating the model of each node from the frames of its corresponding grouping, as is shown in the formation of the uppermost word model 132a shown in FIG. 8. Then this first word model is time aligned against the acoustic description 131a by the forward scoring 218 and the traceback 220 of FIG. 5. Then the frames 130 of this description which are time aligned against each of the initial node 133 are used to make a new estimate of that node, as is shown by the groupings in the second view of the token 131a in FIG. 8, and the arrows leading from each such grouping to its corresponding node 133 in the second calculation of the word model 132a. This cycle of forward pass 218, traceback 220, and model re-estimation 222 for the word model 132a is shown being performed once more in FIG. 8. In the preferred embodiment, this model building cycle of steps 218, 220, and 222 would be executed iteratively for 8 passes.

FIG. 8 also is used to show how, in an alternate embodiment of the invention, a backup dictionary including the phonemic pronunciation of each word can be used. The dictionary 500 shown in FIG. 3, and used in the embodiment of the invention described with regard to FIG. 1, merely consists of an alphabetical listing of word spellings 504 which can be used as machine responses if such spellings are selected by the user and confirmed for output to the application program. In the alternate embodiment using a phonemic dictionary 500a, shown in FIG. 8, each of the word entries 504a in the phonemic dictionary has associated with it a spelling comprised of phonemic symbols 506. There are well know methods in the art of speech recognition for producing an acoustic model of a word for which a phonemic spelling has been provided by stringing together models for each of the phonemes in that word's phonemic spelling. Models for each such phoneme can be derived by building acoustic models of words having a known phonetic spelling, in the manner shown in the top half of FIG. 8, and then using the acoustic node models 133 associated with each phoneme in that model as a model of its associated phoneme. Preferably data from a plurality of nodes 133 associated with the speaking of a given phoneme 506 in several different words are combined, as is shown in FIG. 8 to produce the phoneme model 508 associated with that phoneme. As those skilled in the art are well aware, the making of such phoneme models requires that the phonemic spelling used be one which corresponds well with the individual nodes which tend to be formed in the training of the acoustic word models used to obtain data for the formation of those node models. As is also known in the speech recognition arts, phonemic models give improved performance if those models take into account the phoneme preceding and following a given phoneme in question. Thus in the example of FIG. 8. the schwa sound for which a phonetic model is shown being made is a schwa occurring at the start of a word before a "b".

In such an embodiment, once a model is made by the method shown in FIG. 8 for each phoneme, an acoustic model can be made for each word in the phonetic dictionary 500a. In such an embodiment the recognition of step 123 can be performed against phonemic acoustic models which have been produced from the phonemic spelling in the acoustic dictionary without having the user individually train their associated word, as well against acoustic models of words which have been individually trained. When recognition is being performed against phonemic as well as against individually trained acoustic models, it is desirable that a language model be used to limit the recognition vocabulary to a number of words which the recognizer can handle in a response time which the user finds satisfactory. This is done by limiting the recognition vocabulary to such a number of words which the language models considers most likely to occur in the current language context.

Returning now to FIG. 1, after steps 208, 214, and 216 have stored the token associated with the just confirmed word, and made and stored a new acoustic model for that word based at least in part on that token, the program advances to steps 178, 180 and 188, described above, which store the confirmed word in the language context buffer, use the confirmed word to update the language model probabilities, and output the confirmed word to the application program. Then, in step 102, the program flow returns to the application program. The application program responds to the output of the ASCII string representing the confirmed word, and then causes the program flow to advance to the top of FIG. 1 to get the next input from the user.

If, when the dictation program advances to the tests of steps 106-110, the input detected from the user corresponds to a letter command, the test of step 109 is satisfied and the program branch under that step is executed. The letter commands are commands which either instruct a letter to be added to a string called the STARTSTRING, or which specify an editing function to be performed upon the STARTSTRING. The STARTSTRING is a string which specifies the initial letters of the word to be recognized (i.e., the word represented by the token in REC_TOK)

When the system is in TEXTMODE, the only letter commands allowed are either the pressing of any letter key or the speaking of "starts_alpha", "starts_beta", etc. which correspond to the pressing of "a", "b", etc. These commands indicate the first letter of the STARTSTRING, and they cause the system to be switched to EDITMODE, in which the recognition performed at the top of FIG. 1 has its vocabulary limited to letter commands, the delete command discussed above with regard to step 106, the pick-choice commands discussed above with regard to step 107, and the edit-choice commands discussed below with regard to step 110. In the EDITMODE, the letter commands include commands for adding another letter to the end of the STARTSTRING either by pressing a letter key or speaking of a word from the communications alphabet which is associated with such a letter (i.e., "alpha" for "a", "beta" for "b", "charlie" for "c", etc.). In the EDITMODE, the letter commands also include a command for deleting the last letter added to the STARTSTRING either by pressing the "backspace" key, or by saying "backspace". Limiting the recognition vocabulary in EDITMODE improves the speed and accuracy of its recognition. Also, it lets the commands for adding individual letters to the STARTSTRING be changed from "starts_alpha" through "starts_zulu" to the more quickly said "alpha" through "zulu". This change is made possible by the fact that the EDITMODE's restricted vocabulary does not contain text words which are the same as, or confusingly similar to, the words of the communications alphabet.

Once Step 109 detects that the user has entered a letter command, it advances to step 260, which sets the system's recognition mode to the EDITMODE so that user can further add or subtract letters from the edit string, as described above. Then in step 262 the program adds the specific letter indicated by the letter command to the current STARTSTRING, or performs the specific editing command upon the STARTSTRING specified by the letter command. When test 109 is first passed for a given token in REC_TOK, the STARTSTRING will have been previously cleared either by step 101, step 192, or step 204. When that test is passed for the second or subsequent time for a given token in REC_TOK, the STARTSTRING will normally already have one or more letters in it, and the new letter is added to the end of that string.

After step 262 has been performed, the program advances to step 264, which saves the token stored in REC_TOK in SAV_TOK. This is done so that if the user later confirms that the spoken word represented by the token in REC_TOK corresponds to a given word choice, that token will be used by steps 208, and 214, described above, to make a token and a model of that confirmed word.

Then step 266 restricts the active vocabulary to be used by the rerecognition step 272, described below, to words which start with the current STARTSTRING. Techniques are well-known by those skilled in the computer arts for matching the spelling of each word in a vocabulary list against a string of initial characters and selecting only the words that start with the indicated initial string.

Then step 268 retrieves a list of vocabulary words from a backup dictionary which also start with the specified initial string, but which are not in the active vocabulary of words having acoustic models selected by step 266. In the embodiment of FIG. 1, the backup dictionary 500 (shown in FIG. 3) is a large dictionary with 80,000 or more entries. Step 268 uses probabilities from the language model to select, from the words in the backup dictionary which start with the current STARTSTRING, the up to nine words which are the most likely to be used in the current language context.

Next step 270 displays the current STARTSTRING in a Definition Window which shows the operator the initial string which has been specified so far. The Definition Window is shown as box 703 in the example illustrated in FIG. 10-24. It is called a Definition Window because, when a new word is added to the vocabulary of acoustic word models, its spelling is defined by being entered into the Definition Window through a combination of letter commands and/or edit-choice commands, as will be described below.

After the STARTSTRING is displayed in the Definition Window, step 272 performs rerecognition upon REC_TOK with the words eligible for selection limited to the restricted active vocabulary produced by step 266, described above. This rerecognition uses the same speech recognition algorithm described above with regard to step 123, except that the recognition is performed upon the token in REC_TOK rather than that in TEMP_TOK, the active vocabulary is restricted, and a watchdog routine is regularly polled during recognition so that the recognition will be interrupted if there is any user input.

Once the rerecognition of step 272 is complete, step 274 displays the best choices from that recognition in the active window 701 (except nothing new is displayed in this step if the recognition was interrupted by new user input), in the same numbered ordered as the best choices produced by the recognition performed in step 123. The only difference is that in step 274 (a) the active window 701 is displayed below the definition window 703, rather than directly beneath the current cursor position of application program, and (b) a second window, called the dictionary window 702, is displayed directly below the window 701. The dictionary window contains enough of the backup words selected from the backup dictionary by step 268, to bring the total number of choices presented in both the active window 701 and the dictionary window 702 up to a total of nine words. Of course if there are not enough recognition choices and backup words selected by steps 272 and 268, respectively, to provide a total of nine choices in both windows, a lower total number of choices will be presented.

After step 274 finishes its display of word choices, the program again advances to the top of FIG. 1 to get new input from the user.

In the alternate embodiments described above in which a phonemic dictionary is used, the step 268 can be dispensed with, and the subvocabulary of words which start with the startstring selected by step 266 includes both words for which there are individually trained, as well as phonemic, acoustic words models. If this vocabulary of such words which start with the STARTSTRING is too large to be recognized with a satisfactory response time, the language model can be used to further limit this vocabulary to a number of words which can be recognized sufficiently promptly. In such an embodiment the rerecognition of step 272 is performed upon both the restricted vocabularies of both individually trained and the phonemic acoustic word models, and step 274 displays the choices from both vocabularies.

If, when the program advances to the tests in steps 106-110, the input detected from the user is an edit-choice command, test 110 is satisfied and the branch of the program of FIG. 1 below that step is executed. Edit-choice commands are commands which select a given one of the word choices displayed in the active window 701 or the dictionary 702 and cause the spelling of that word to be made the STARTSTRING, just as if the user had entered each of the letters in that spelling through a sequence of letter commands. The edit-choice commands include the double-clicking of any of the function keys "f1" through "f9" corresponding to a word choice displayed in either window 701 or 702 or the speaking of an utterance "edit_one" through "edit_nine" corresponding to the number of such a function key.

As can be seen from FIG. 1, the steps performed in response to an edit-choice command are identical to the steps performed in response to a letter command, except that step 278, which sets the STARTSTRING equal to the letters of the chosen word, differs from step 262.

The edit-choice commands are very useful because when the active window 701 and the dictionary window 702 fail to display a desired word, they often display a word which starts, but does not end, with the characters of the desired word. The double-click function lets the user enter such a similar word into the definition window, where the user can delete undesired characters if necessary and then add desired letters using the letter commands.

After steps 276, 278 and 264-274 have been completed in response to an edit-choice command, the program again returns to the top of FIG. 1 to get the user's next input.

FIGS. 10-24 show how the preferred embodiment operates for a sample phrase. In this example, the speech recognition system begins with an empty vocabulary list. That is, it is assumed that the user has not yet trained up acoustic models for any words. The user wants to enter the phrase "This invention relates to", such as at the beginning of the specification of this patent application.

Figure 10:
FIGS. 10-24 illustrate an example of the sequence of computer displays which result when the program of FIG. 1 is used to enter the phrase "This invention relates to" into the system.

Turning to FIG. 10, first the user says the word "this". Step 111 detects this utterance and step 119 causes an acoustic representation, or token, of the utterance to be saved in TEMP_TOK. Then, since the program starts in TEXTMODE, step 123 calls the speech recognition algorithm described in FIG. 4. Since the active vocabulary is initially empty (that is, there are no words with acoustic models against which recognition can be performed), the recognizer produces no best choices. As is described above, step 108 assumes the utterance of a word for which the recognizer can find no matches is an utterance of a text word, and thus causes the test of that step to be satisfied in response to such a recognition failure. This causes steps 170-188 to be performed. Step 170 sets the system to TEXTMODE, which it is already in. Step 172, stores the unrecognized utterance's token in REC_TOK. Step 174 does nothing, because there is no prior top choice displayed, and step 176 displays the choices from the recognition. Of course, since the choice list produced by the recognition step 123 is empty, the Active Choice Window 701 displayed by step 176 contains only the option "del [reject]". This indicates that the operator may press the "delete" key to abort the utterance, as shown in steps 106, 190, 192, 194, and 196 of FIG. 1. After the choices are displayed, test 803 is satisfied because SAV_TOK is still empty, and the program advances to steps 178, 180, and 188. Since there is no prior confirmed word, these steps do nothing but return to the application program, which in our example is a word processor. Since step 188 provides no output to the word processor, it does nothing in step 102, except return to the polling loop 103 of the program of FIG. 1 to get the next user input.

In our example, the operator responds by typing the letter "t". This causes steps 104 and, since test 801 is satisfied, 105 to get that keystroke and supply it to the tests of steps 106-110. Since "t" is a letter command, the test of step 109 is satisfied, which causes steps 260-274 to be executed. Step 260 changes the system's recognition mode to EDITMODE. Step 262, adds the letter "t" to the previously empty STARTSTRING. Step 264 saves the token currently in REC_TOK in SAV_TOK, so it can be used for the training of a word model if the user confirms a word for that token. Step 266 restricts the active vocabulary to word models whose corresponding spellings begin with the current STARTSTRING, "t". Of course, at this time in our example there are not trained word models, so this active vocabulary is empty. Then step 268 finds the list of words in the backup dictionary which begin with the current STARTSTRING "t", and picks the nine of those words most likely to occur in the given language context according to the language model. In the example the language context buffer is currently empty, so the language model selects from the backup vocabulary based on the context independent word probabilities indicated in step 184 of FIG. 9.

Figure 11:
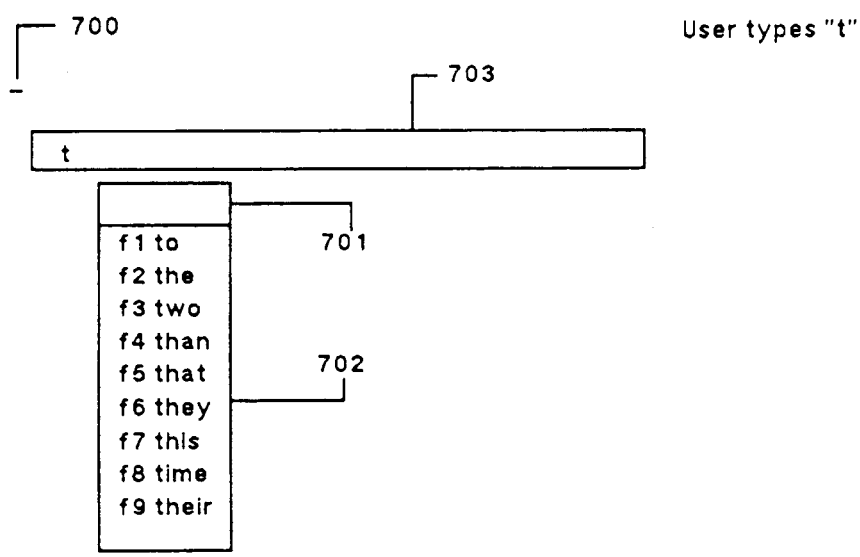

After step 268 picks nine backup words, step 270 displays the definition window 703 shown in FIG. 11, step 272 does nothing since the active vocabulary for rerecognition is empty, and then step 274 displays the empty active window 701, and all nine of the backup words picked in step 268 in the dictionary window 702. Then the program advances back to the top of FIG. 1 to wait for the next input from the user. At this point, the computer display appears as shown in FIG. 11.

In FIG. 11, the correct word "this" appears in the Dictionary Window 702, and is associated with function key "f7". In our example it is assumed that the user next types function key "f7", to confirm the word "this". As a result, steps 104 and 105 get the keystroke causes the test of step 107 to be satisfied. This causes steps 200, 202, 204, 206, 208, 214, 216, 178, 180, and 188 to be performed. Step 200 changes the recognition mode back to TEXTMODE, because now that the user has confirmed a word for the last text word, it is assumed he will utter another text word. Step 202 saves the token REC_TOK in SAV_TOK. In this instance, this has no effect since this token has already been saved in SAV_TOK by step 264. Step 204 clears REC_TOK and STARTSTRING and pop-up windows 701, 702, and 703 to prepare for the recognition of another text word. Step 206 confirms the indicated word "this" as the word corresponding to the last text word, that represented by the token in SAV_TOK. Step 208 stores the token in SAV_TOK in the tokenstore, labeled with the confirmed word "this". Step 214 checks the tokenstore for all tokens labeled with the word "this", of which there is currently only the one just stored, and then forms an acoustic word model for that word using that token. Step 216 stores this word model in the acoustic model store used by the recognizer.

After step 216 stores the new acoustic model for the word "this", step 178 stores the confirmed word "this" as the most recent word in the language context buffer. Step 180 then updates the language model probabilities to reflect the occurrence of the word "this". Then step 188 outputs this word to the application program as if it had been typed on the computer system's keyboard. By techniques well-known to those skilled in the arts of computer word processing, the dictation program keeps track of punctuation rules, such as capitalizing the first word of a sentence. Thus, the keystrokes sent to the application by step 188 in the preferred embodiment would include an upper case "T". The user, however, types all in lower case except for words, such as proper names, which are always capitalized.

Figure 12:

Once step 188 produces this output string, it returns control to the word processor application program at step 102. This word processor responds to the string "This" output by step 188 by inserting that string into the text it is creating and onto the screen as indicated in FIG. 12.

Figure 13:
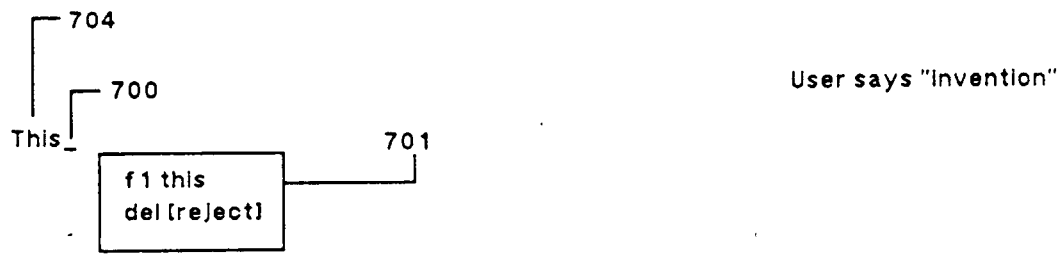

After all these steps are performed, the program advances again to polling loop 103 to get the next input from the user. In our example, the user says the word "invention". In response, steps 111, 119, 121, and 123 are performed, causing an acoustic match of the token of that utterance against each word in the active vocabulary. Since in our example the word "this" is the only word for which an acoustic model has been trained, it is the only word currently in the active vocabulary, and thus it is supplied as the input to the tests of steps 106-110. This causes the test of step 108 to be passed and the branch of the program below that step to be performed. Most importantly for our purposes, step 172 causes the token of the word just spoken to be saved in REC_TOK and step 176 displays the active choice window 701, as shown in FIG. 13. Since there were no word choices displayed when the word "invention" was spoken, step 174 does not confirm any word choice and steps 803, 178, 180, and 188 do not do anything except return control to the word processing application. The application, since it has not received any output from step 188, merely retuns to step 103 of the dictation program for more user input.

Figure 14:
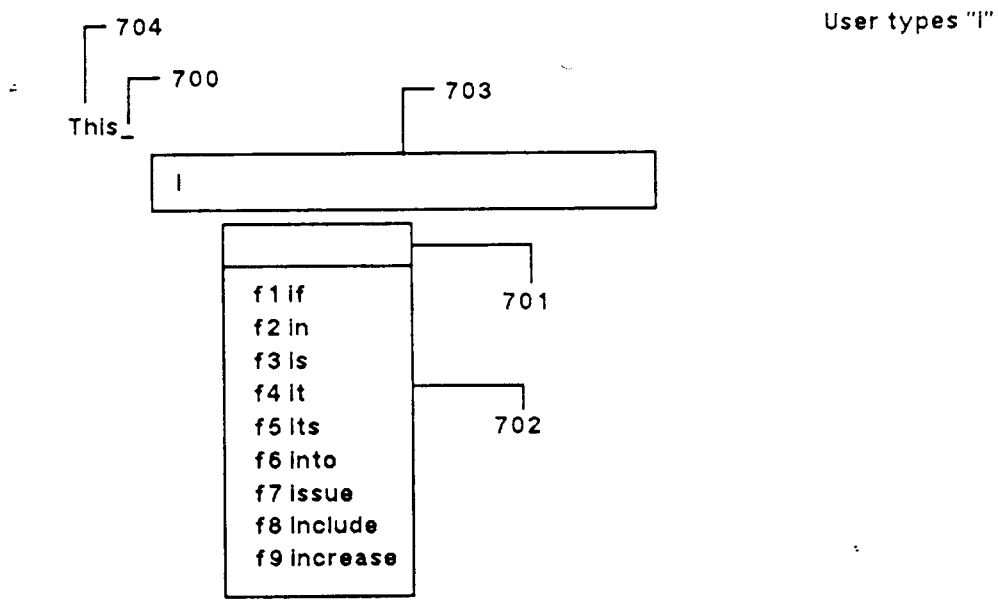

At this point in our example the user types the letter command "i" to indicate that the utterance to be recognized begins with that letter. In response, the test 109 is satisfied, STARTSTRING is set to "i", the token in REC_TOK is saved in SAV_TOK for potential use in making a word model, and the active vocabulary is restricted to words starting with "i". In the current state of the example, since no acoustic models have been trained for words that start with "i", the active vocabulary is thus made empty. Step 268 then retrieves a backup vocabulary of the nine most likely words to occur in the current language context which start with the letter "i". Then step 270 displays the STARTSTRING "i" in the definition window 703 as shown in FIG. 14. Step 272 does nothing since there is no active vocabulary for rerecognition. Step 274 displays the resulting empty active choice window 701, and the dictionary window 702 which contains the most likely "i" words selected by step 268. Then the program returns to the step 103 for the next user input. At this time the computer display has the appearance shown in FIG. 14.

In our example it is assumed that the user next types the letters "n", "v", "e" in successive passes through the sequence of steps 104, 105, 109, 260, 262, 264, 266, 268, 270, 272. In the embodiment of FIG. 1, the speech recognition algorithm performed in step 272 is provided with a watchdog capability. This causes the algorithm to check at a relatively high frequency, in terms of human perception, such as at ten times a second, for the detection of new input from the user, either in the form of a keystroke or an utterance. If such new input is detected before the rerecognition of step 272 is completed, that step will be aborted and the program will jump immediately to polling loop 103 to get the user's new input. This allows the user to rapidly enter a sequence of letters or other editing commands without having to wait for the system to complete the relatively lengthy computation of a rerecognition after each such entry. But this scheme will allow the system to complete rerecognition whenever the user pauses long enough after the entry of the last letter for such a rerecognition to take place. Thus the user can type a few letters, stop and see if that selects a few words, and if not type a few more letters or the remainder of the word.

Figure 15:
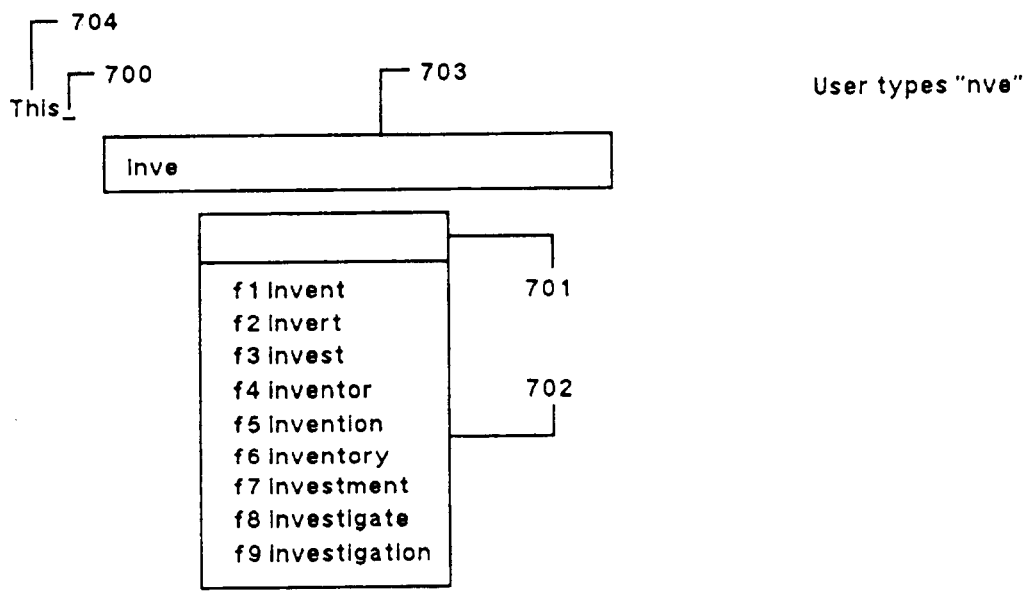

After the user has entered the characters "nve" and the branch of the program under step 109 has had a chance to respond to the resulting STARTSTRING, the computer display has the appearance shown in FIG. 15. The definition window 702 displays the current STARTSTRING "inve", and the dictionary window 702 has a list of word beginning with "inve", including the correct word "invention", associated with function key "f5".

Figure 16:
Figure 17:
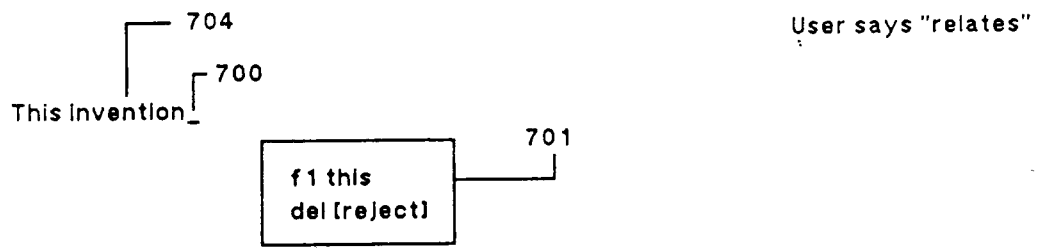

In the example, the user then presses the function key "f5" as a pick-choice command to select the word "invention" as the confirmed word. As a result, the test of step 107 is satisfied and the branch of the program under that step is executed. Step 206 causes the word "invention" to be confirmed. Steps 208, 214, and 216 cause the token of the utterance associated with that word to be saved in the token store and an acoustic model of the word "invention" to be made using that token. Step 178 causes the word "invention" to be stored as the most recent word in the language buffer and the word "this" to be stored as the next to the most recent word in that buffer. Step 180 uses the two words in the language buffer to update the language model probabilities, and finally step 188 causes the keystokes "invention" to be sent to the application. (Notice that the system has automatically, as one of its punctuation rules inserted a space before the word "invention" in the keystrokes as sent to the application.) Then, in step 102, the application program inserts this sequence of keystrokes into the text it is creating, as indicated in FIG. 16, and then returns to polling loop 103 for the user's next input. Notice that the system is now in a state in which no windows are displayed. If the user enters any keystrokes at this point, the test in step 801 will not be satisfied and step 802 will be executed and the keystroke will be sent directly to the application. To the user, this mode would be like ordinary typing.

Next the user says the word "relates", which causes steps 111, 119, 121 and 123 to be performed. At this point there are two words, "this" and "invention" in the active vocabulary. However, "invention" is such a poor acoustic match for "relates" that it is not in the choice list produced by the recognition in step 123. "This" is the best choice produced by the recognition and it causes the test 108 to be passed, which causes step 176 to make the active window display shown in FIG. 17. Since there were no word choices displayed at the time the user spoke the word "relates", step 174 does not confirm any word and thus steps 803, 178, 180, 188, and 102, have no effect but to return to step 103 to await the user's next input.

The user then types the letters "rel", in response to each of which the branch of the program beneath step 109 is executed. After this branch of the program is executed for the last letter "l" in this sequence, the computer display has the appearance shown in FIG. 18. The then current STARTSTRING "rel" is shown in the definition window 703. Since there are no acoustic word models associated with spellings which start with the letters "rel", the active choice window 701 is blank. The dictionary window 702 contains a list of words beginning with the letters "rel", with "relate" as the first choice.

Figure 18:
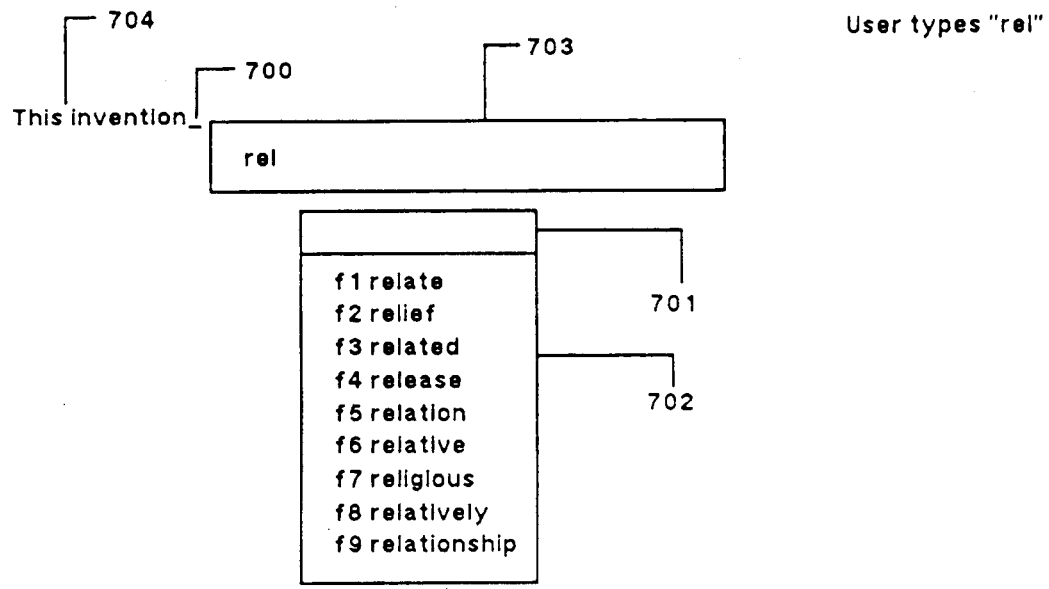
Figure 19:
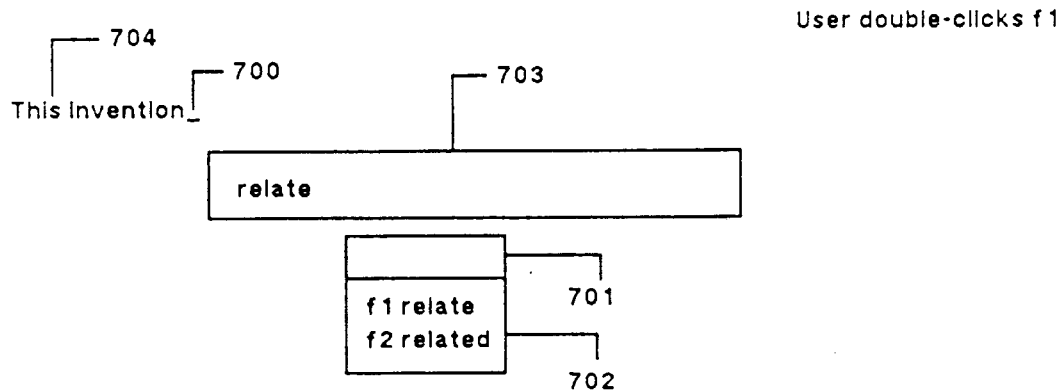

After the display shown in FIG. 18 is made the program advances to polling loop 103 to wait for the user's respone. In the example, the user now double-clicks (presses twice quickly) the function key "f1". In response, step 105 detects the double click and supplies a double click character corresponding to "f1" to the tests of steps 106-110. This cause the test of step 110 to be satisfied and the branch of the program beneath that step to be executed.

As a result, step 276 sets the program to EDITMODE, the mode it was already in. Step 278 makes the word "relate" the STARTSTRING. Step 264 saves the token in REC_TOK in SAV_TOK, which has no effect since this has previously been done for each of the letters "rel" typed in by the user. Step 266 leaves the already empty active vocabulary empty. Step 268 restricts the backup vocabulary to the two words "relate" and "related", since the desired word "relates" is not a separate entry in the dictionary. Step 270 displays the STARTSTRING "relate" in the definition window 703. Step 272 does nothing since the active vocabulary is empty. And step 274 displays the windows 701 and 702, before the program advances to polling loop 103 for more user input. This sequence of steps produces the display shown in FIG. 19.

The user then types the letter "s" to complete the word "relates". Step 109 responds to this letter command by causing step 262 to add this letter to the STARTSTRING. Step 270 produces the display shown in FIG. 20. Then the program advances through steps 264, 266, 268, 270, 272, and 274 for the same token, and then to polling loop 103, where it waits for the user's response. As FIG. 20 indicates, step 270 displays the STARTSTRING "relates" in the definition window 703, but there is no active window 701 or dictionary window 702 displayed, because there are no words in either the active vocabulary or in the dictionary which begin with the letters "relates". In the preferred embodiment illustrated in this example, the DELETE command is only active in TEXTMODE, not in EDITMODE, so "del[reject]" is not displayed.

Figure 20:
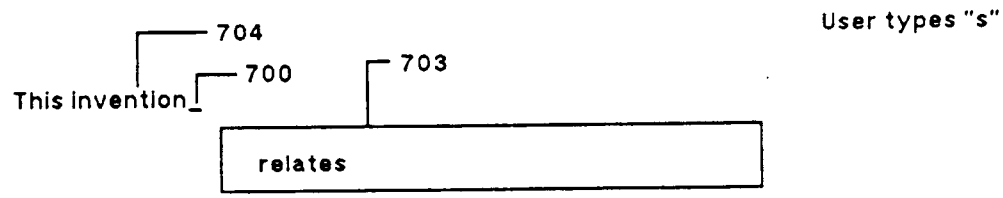
Figure 21:
Figure 22:
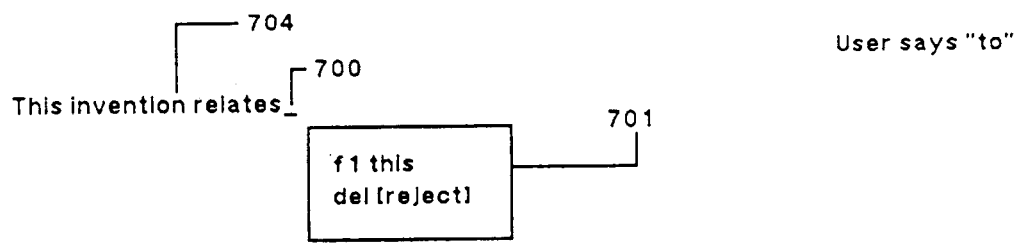
Figure 23:
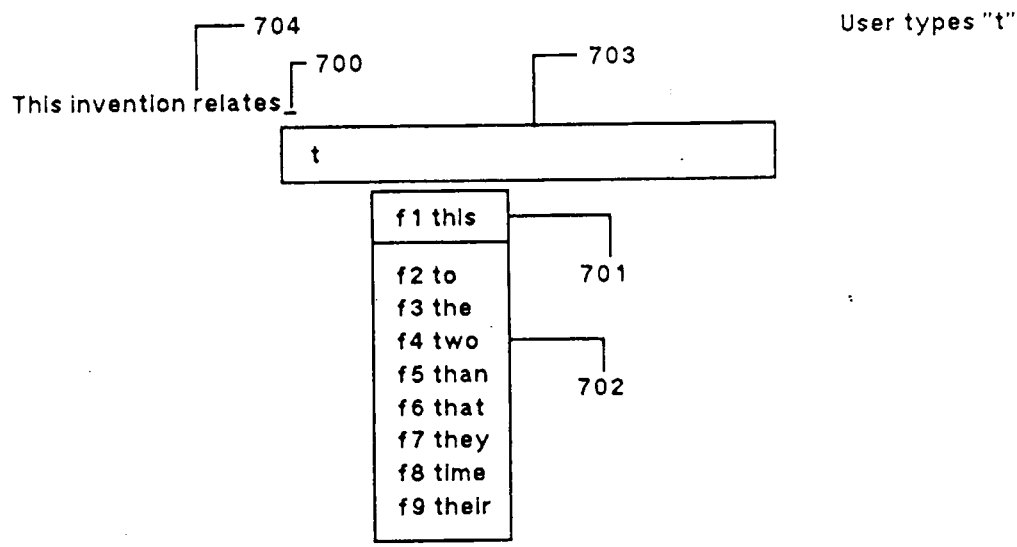
Figure 24:
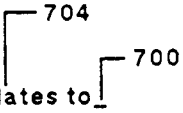

Since the word in the definition window 703 in FIG. 20 is correct, the user presses the "enter" key (which is called the "return" key on some keyboards). This key is interpreted by the program as a pick-choice command for selecting the word in the definition window as the confirmed word. In response to this input, the test of step 107 is satisfied, and the branch of the program beneath that step is executed. Most importantly, step 200 returns the program to TEXTMODE, the STARTSTRING "relates" is made the confirmed word, the token in SAV_TOK corresponding to the utterance of that word is saved in the tokenstore with the label "relates" and is used to make an acoustic model of the word "relates". The "relates" is stored in the language context buffer as the most recent word and "invention" is moved to the second most recent word. These two words are then used to update the language model probabilities, and "relates" is output to the word processor application, which inserts that string into its text at the cursor location as indicated by FIG. 21. Then the program returns to polling loop 103 for the user's next input. Again the system is in a state in which the test in step 801 would not be satisfied, so the user could do normal typing.

At this point the user says the next word "to". This causes the TEXTMODE recognition of step 123 to be performed upon the token resulting from that utterance. The best matching word in the active vocabulary is the text word "this", so the test of step 108 is met and "this" is displayed in the active choice window 701.

The user then types the letter "t", which causes the branch of the program beneath step 109 to be performed. In response, the STARTSTRING is set to the letter "t". The active vocabulary is restricted to words beginning with "t", a backup vocabulary of "t" words is selected, and rerecognition is performed on the active vocabulary. Since at this point the active vocabulary contains one word beginning with "t", the word "this", "this" is selected as a best choice of the rerecognition. After this rerecognition the computer screen has the appearance shown in FIG. 23. The correct word "to" is the choice associated with the function key "f2" in the dictionary window 702. Thus the user presses the function key "f2" to confirm the word "to" producing the display shown in FIG. 24.

Notice that by speaking each of the four words only once, with no explicit training or enrollment, and using a total of only 15 keystrokes (16 keystrokes if the double-click is counted as two), the user has entered the text "This invention relates to" (which would normally take 25 keystrokes by itself), and has created four acoustic models so that when any of these words occurs again later it can probably be entered with no keystrokes at all (because a correct recognition can be confirmed by beginning the next utterance, which will cause the test of step 108 to be satisfied and the branch of the program beneath that step to be executed.)

The user does not have to train an initial enrollment vocabulary. To add a new word to the vocabulary, it is only necessary to use the word in the actual course of generating a document. With the aid of the backup dictionary, it often takes fewer keystrokes to add a word to the active speech recognition vocabulary than it would take to type the word normally.

It should be understood that if the user had trained up acoustic models of the pick-choice, letter and edit-choice commands used in the example above he could have evoked those commands by speaking them, causing basically the same result indicated above.

Figure 25:
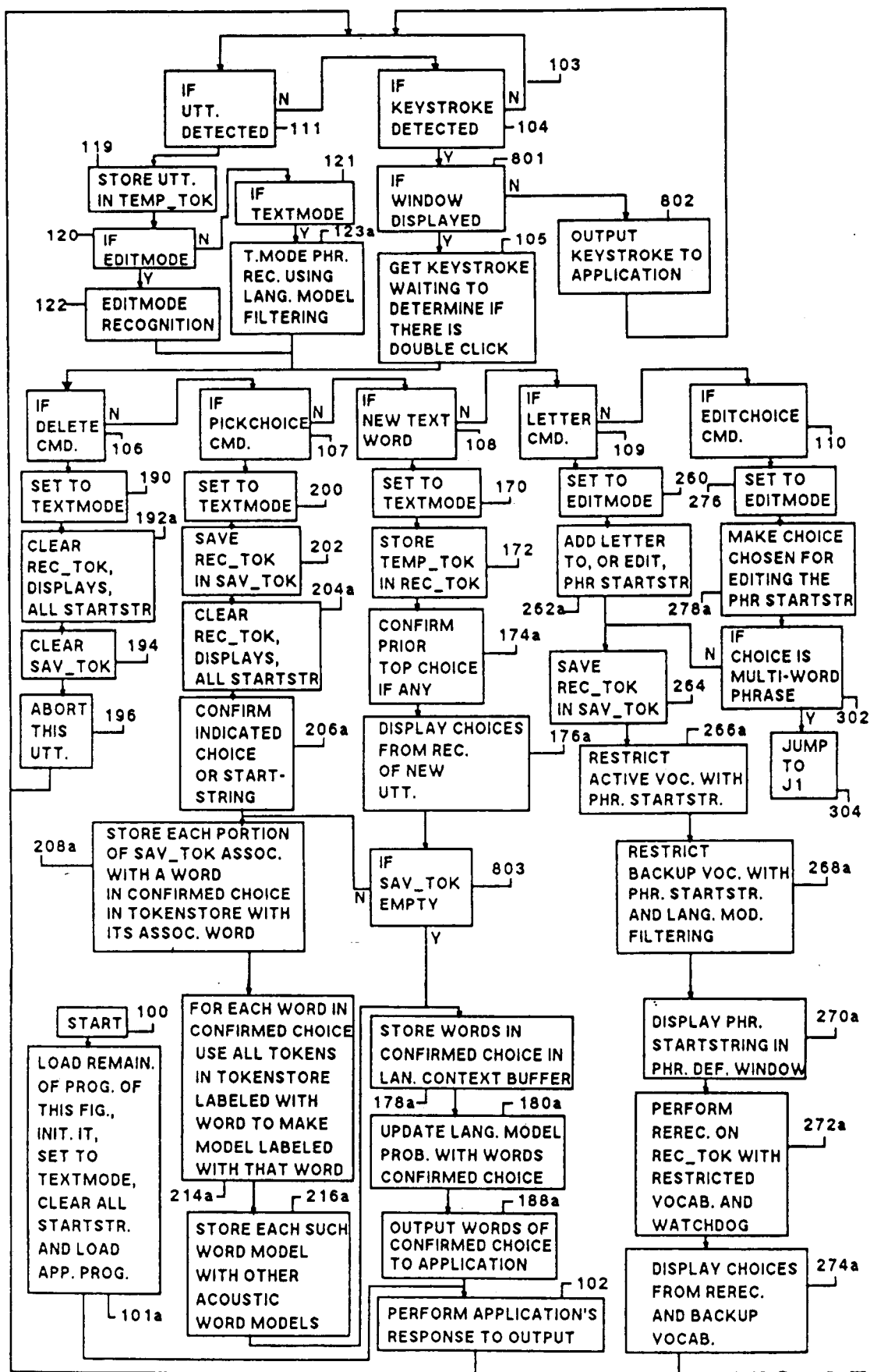
FIG. 25 is a schematic block diagram of the functional steps of a connected phrase speech recognition system which embodies the present invention.
Figure 26:
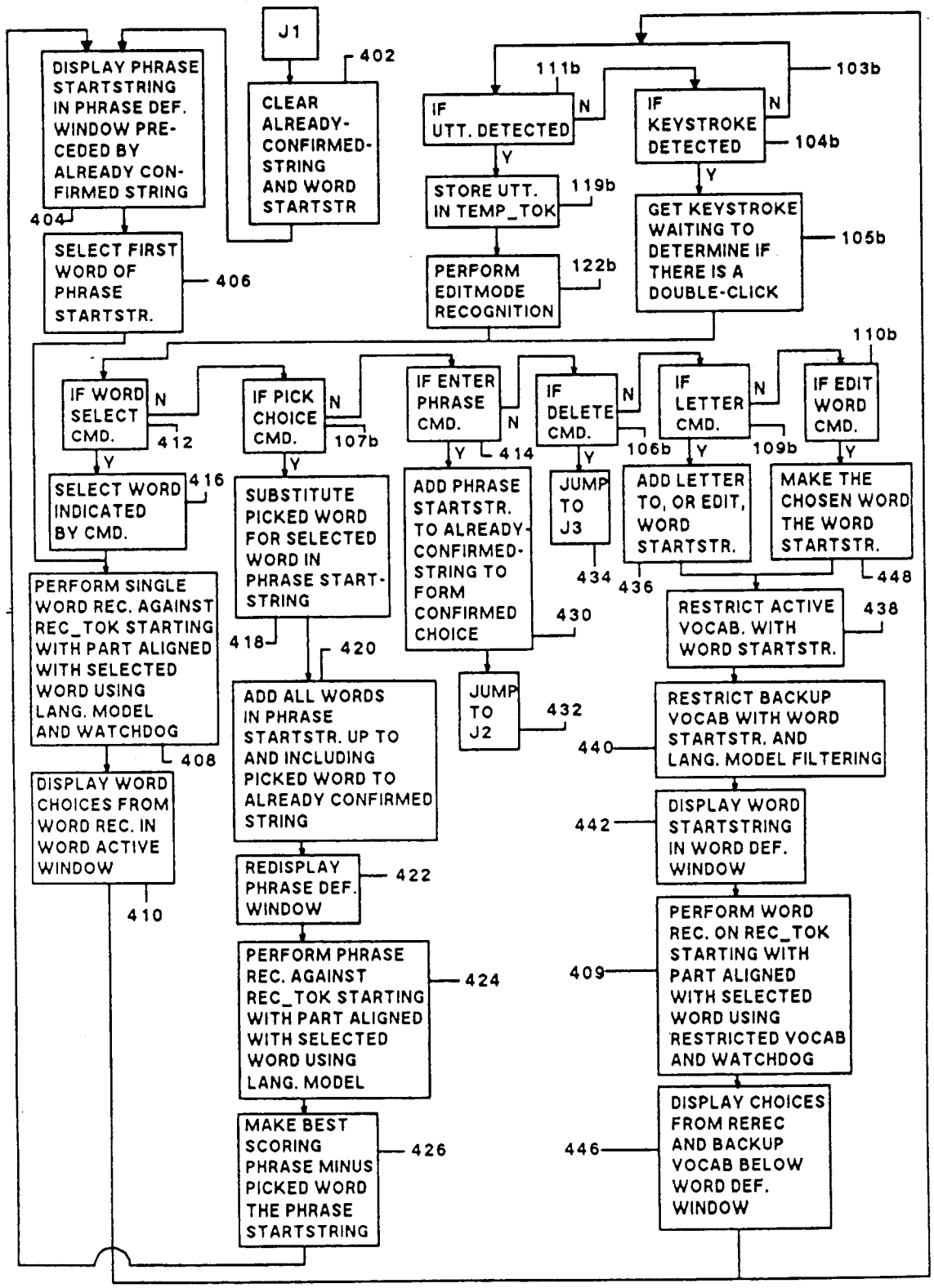
FIG. 26 is a continuation of the schematic block diagram of FIG. 25, illustrating the steps of the phrase edit mode of that system.

Referring now to FIGS. 25 and 26, an alternate embodiment of the present invention is shown which is designed to recognize, and to enable users to correct the recognition of, speech spoken either as individual words separated by pauses or brief phrases of several continuously spoken words, each of which phrases is separated by a pause. The functional steps of FIG. 25 are exactly the same as, and have the same or corresponding numbering of those in FIG. 1, except for the following: In steps 123a the speech recognition algorithm is a phrase recognition algorithm designed to recognize an entire phrase of continuous or connected speech. In steps 192a, 204a, 262a, 278a, 266a, 268a, and 270a, the STARTSTRING involved is the PHRASE_STARTSTRING, which lists the initial letters of the utterance of one or more words currently being recognized. This PHRASE_STARTSTRING itself can contain more than one word. The definition window 703a in which the PHRASE_STARTSTRING is displayed is called the phrase definition window 703a (shown in FIG. 30). Step 176a and 274a display the entire recognized phrase in the phrase active window 701a (shown in FIG. 27), so that the choices displayed can be either single words, multiple word phrases, or a mixture of both. The steps 206a, and 174a, confirm the entire phrase choice selected by the user rather than just an individual word. The steps of 208a, 214a, 216a make tokens and acoustic word models for each word in the confirmed phrase rather than just for a single word. Step 178a stores all the words of the confirmed phrase in the language context buffer, rather than just a single confirmed word. Step 180a updates the language model based on each of these confirmed words. Step 188a outputs all the words of the confirmed phrase to the application rather than just an individual word. Finally, the greatest difference is that if the user picks the edit-choice command and the phrase selected for editing contains more than one word, a new test 302, shown in FIG. 25, will cause the program to make the jump 304 to the entirely new phrase edit routine shown in FIG. 26.

Figure 5A:
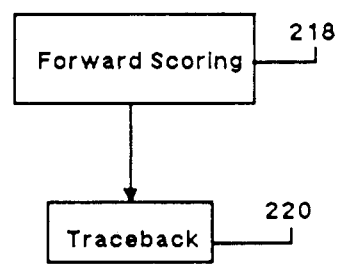
FIG. 5A is a modification of the block diagram of FIG. 5 for recognition of continuous speech using hidden Markov models.

Before we discuss FIG. 26, it should be pointed out, as was discussed above, a continuous speech algorithm suitable for use in the phrase recognition of step 123a would be very similar to the training algorithm discussed above with regard to FIGS. 5 and 6, except that FIG. 5 should be replaced with FIG. 5A. The only differences between the training algorithm of FIG. 5 and the continuous speech algorithm of FIG. 5A is that the re-estimation of parameters 222 is left out in the continuous speech of FIG. 5A, and the statistics kept during the traceback step 220 are different in the two figures. When step 220 is used for continuous speech recognition, the statistics to be recorded consist merely of the sequence of words along the best path that is being traced back. This word sequence will become available in reverse order, but those skilled in the arts of computing know that it is easy to save such a word sequence and reverse it, to display the forward word sequence to the user and to send it to the application.

It should also be noted, with regard to FIG. 25, that steps 266a and 268a restrict the active vocabulary and the backup vocabulary to words starting with the PHRASE_STARTSTRING, and if that string contains any spaces, step 266a will only select entries from the acoustic word model store and step 268a will only select entries from the backup dictionary which contain an identical string having the same spaces. Such multiword entries will normally be quite rare, causing the active vocabulary and the backup vocabulary chosen by these two steps normally to be empty if the PHRASE_STARTSTRING contains more than one word. The recognition of step 272a is single word recognition, just as in FIG. 1, and it can only recognize a multiword phrase if an individual acoustic model has been trained for that phrase as if it were one word.

Figure 27:
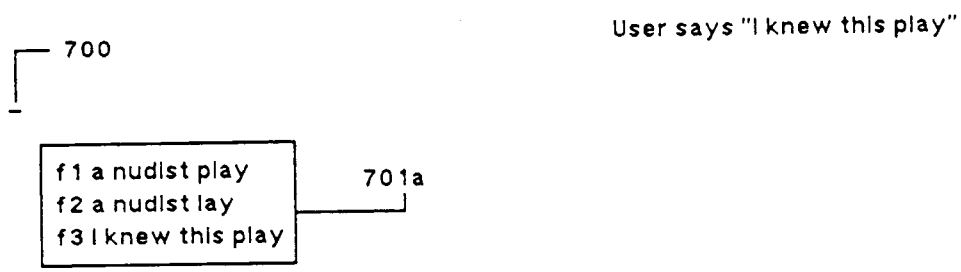
FIGS. 27-36 illustrate an example of the sequence of computer displays which result when the program of FIGS. 25 and 26 is used to enter phrases into the system.
Figure 28:

The embodiment of the invention illustrated in FIG. 25 operates almost exactly like that of FIG. 1 when the user speaks discrete utterances, with the possible exception that some of the choices displayed in active window 701a, shown in FIG. 27, may contain multiple words.

If, however, the user speaks a multiword phrase, and in response to the first recognition of that utterance the correct phrase is displayed as a choice in the phrase active window 701a, the user can confirm that choice in the same manner as when a correct choice is displayed by the embodiment of the invention shown in FIG. 1. That is, the user can select such a choice by pressing the function key or saying the pick_choice command associated with the correct choice, or by uttering a new utterance which is recognized as something other than a delete, pick-choice, letter, or edit-choice command.

For example, if the user had said "I knew this play" and was presented with the choice display shown in FIG. 27, he could confirm that phrase merely by pressing the "f3" key, or saying "pick_three". If this was done, the "f3" keystroke would be detected and gotten by steps 104 and 105, and that keystroke would cause the test of step 107 to be satisfied. Step 200 would set the program to TEXTMODE. Step 202 would save the token of the utterance "I knew this play" stored in REC_TOK in SAV_TOK for use in making word models. Step 204a would clear REC_TOK and all startstrings, including PHRASE_STARTSTRING for use in the next recognition. Step 204a would also clear pop-up window 701a. Then step 206a would confirm the indicated choice associated with the "f3" key, the choice "I knew this play". Step 208a would store in the tokenstore each portion of the token in SAV_TOK, which is time aligned against the acoustic model of each word in the confirmed string as a separate token, and would label each such token with the individual word against which it was time aligned, and then clears SAV_TOK. In the preferred embodiment of FIG. 25, this time alignment is recalculated for step 208a by using the phrase recognition algorithm described with regard to FIG. 5A and FIG. 6 to time align the sequence of acoustic models associated with the confirmed words against the entire token in SAV_TOK, unless such a time alignment has been stored for the token in SAV_TOK by the steps in FIG. 26.

Once step 208a has stored in the tokenstore an acoustic token for each of the words in the confirmed phrase, step 214a builds an acoustic word model for each of the words in the confirmed phrase, using each of the one or more acoustic tokens stored in the tokenstore with that word as a label. Step 216a stores each such newly built word model in the acoustic word model store for future use by the speech recognition system. After this is done, step 178a stores each of the words in the confirmed phrase in order in the language context buffer, which in the embodiment of FIG. 25 is designed to hold as many words as can be said in the size phrase the system is designed to hold, plus one previous word. The step 180a uses each of the words in the confirmed phrase and the word that precedes it in that buffer to update the language model shown in FIG. 9. Finally step 188a outputs all the words in the confirmed phrase to the application program as if they had been typed into that application on the keyboard and returns to the application program for it to process those keystrokes. Then the application program returns to polling 103 at the top of FIG. 25 for the next input from the user.

If, on the other hand, when the user speaks a multiword phrase the system fails to correctly recognize it, he has two major ways to get the correct phrase entered with the embodiment shown in FIGS. 25 and 26. The first is to enter all the characters of the phrase with letter commands, either by typing them or by speaking them with the communications alphabet (with any spaces in the desired string being indicated by the word "space"), followed by confirming the resulting PHRASE_STARTSTRING by either pressing the "enter" key or speaking the word "enter_that". When the user types in such a PHRASE_STARTSTRING, the system of FIG. 25 responds in almost exactly the same manner as when the user types in a STARTSTRING in the embodiment of FIG. 1. There are only two major differences: First, once the user types a space in the PHRASE_STARTSTRING both the active vocabulary produced by step 266A and the backup vocabulary produced by step 268a will be empty, unless there are acoustic word models or dictionary word entries with spaces in them. Second, when the user confirms a multiword phrase, the system may not have enough information to accurately time align each word of the confirmed phrase against SAV_TOK.

This second difference is a little more difficult to understand, so let us explain it in greater detail. When the user has spelled the entire desired string and confirms it by speaking "enter_that" or pressing the "enter" key, the branch of the program beneath test 107 in FIG. 25 confirms this utterance. This branch will respond to the confirmed phrase in the manner described above in which it responded to the confirmation of the phrase "I knew this play". The only difference is that if the step 208A had no acoustic models for one or more of the words in the confirmed multiword phrase, it might not be able to accurately time align each of those words against the token in SAV_TOK, and thus might not be able to make a token and a model for each such word. In the embodiment of FIG. 25 this can be a problem whenever the confirmed phrase contains one or more words for which there is no acoustic model. In alternate embodiments of the invention where phonetic models are provided for each word in a large phonetic dictionary, this will only be a problem for words for which the phonetic dictionary provides no models. When this inability to properly time align all the words in the confirmed phrase occurs, however, its only effect is to prevent tokens and acoustic models for the words which cannot be properly time aligned from being made. If the user wants to train a model of any such word he can still do so by speaking it as a separate word, in which case steps 208a will have no problem time aligning that word against SAV_TOK, and thus steps 208a and 214a will have no problem making a token and a model of it.

The second method of correcting an incorrectly recognized multiword phrase is to use the phrase edit routine of FIG. 26. This routine is called when the user issues an edit-choice command to select a multiword phrase displayed in the phrase active window 701a. As was stated above, such a command satisfies the test in step 110 of FIG. 25, causing step 276 to switch the system to EDITMODE, step 278a to make the chosen multiword phrase the PHRASE_STARTSTRING, and the test in step 302 to be satisfied, which jumps the program to the location J1 shown in FIG. 26, the start of the phrase edit routine.

Referring now to FIG. 26, the phrase edit routine shown there is designed to enable the user to select one of the individual words shown in the phrase definition window 703a which is incorrect, and to correct that word in the same basic manner that the program of FIG. 1 lets a user correct a given word shown in its definition window. As a result, the flow chart of FIG. 26 is in many ways similar to that of FIG. 1.

Referring now to FIG. 26, after the program makes the jump to J1, step 402 clears two strings, the ALREADY_CONFIRMED_STRING and the WORD_STARTSTRING. In the phrase edit mode the user is enabled to edit the phrase in the phrase definition window 703a in a left to right manner. The ALREADY_CONFIRMED_STRING stores those words from the phrase definition window which have already been confirmed by the user at any given time. When step 402 clears this string it indicates that at that time none of the words in the phrase definition window have been confirmed by the user. The WORD_STARTSTRING is a startstring, very much like that used in the embodiment of the invention in FIG. 1, which stores the one or more letters of a desired word which is to replace the word of the PHRASE_STARTSTRING which has been selected for correction. In step 402 the WORD_STARTSTRING is cleared to indicate that at this time no WORD_STARTSTRING has been specified by the user.

After step 402, the program advances to step 404 which forms a part of the phrase edit routine which is repeated each time the user changes a word in the PHRASE_STARTSTRING. Step 404 displays the current PHRASE_STARTSTRING in the phrase definition window 703a, preceded by the ALREADY_CONFIRMED_STRING, which is shown with underlining. When the phrase edit mode is first entered, the PHRASE_STARTSTRING is the multiword phrase selected by the edit-choice command which caused the test of step 110 of FIG. 25 to be satisfied and the ALREADY_CONFIRMED_STRING is empty, so the phrase definition window merely displays the PHRASE_STARTSTRING selected by the edit-choice command.

After step 404, step 406 makes the first word of the PHRASE_STARTSTRING the selected word, which includes showing it in reverse video in the phrase definition window. Then step 408 performs single word recognition against the token in REC_TOK. It starts this recognition at the part of that token which is time aligned against the start of the selected word. In a manner similar to that indicated above with regard to step 208a of FIG. 25, such time alignment can be obtained by performing the recognition algorithm of FIGS. 5A and 6 against that token using only the sequence of word models associated with the current ALREADY_CONFIRMED_STRING followed by the PHRASE_STARTSTRING. The single word recognition of step 408 is like the discrete utterance recognition used in the embodiment of FIG. 1, except instead of the silence scores used in routine shown in FIG. 3 the current word is recognized embedded in a connected phrase. Thus instead of the initialization shown in step 151 of FIG. 4, the first node of each word model is seeded each frame by the score from the last node of the previous word of the connected phrase, as previously computed, in a manner similar to that shown in FIGS. 5A and 6. The observation probability obs_prob(label(WORD,LAST_NODE),FRAME) computed in step 163 would be a special score representing the average score for other speech following the current word, rather than a silence or background noise score. Thus the match routine would compute the match for each word given the context of the preceding words, if any, of the connected phrase which the user has already confirmed, but leaving the right context unspecified.

The recognition routine in step 408 not only picks a best scoring word, but also a list of next best scoring alternate words to be placed on a scored ordered choice list that will be displayed in a word active window 701b. In an alternate embodiment, the scores of all these words could be saved as the continuous speech match routine of step 123a of FIG. 25 does its forward scoring, as shown in FIG. 6. In the preferred embodiment, the match routine in step 408 is called instead because it can also be used to recompute the word scores after a vocabulary restriction or augmentation, as will be done in step 409, described below.

Figure 30:

After the match routine of step 408 returns a choice list for the selected word position, step 410 displays this choice list in a word active window 701b, as shown in FIG. 30, and the program advances to polling loop 103b at the top of FIG. 26 for the operator to select an option by providing input. The steps 103b, 104b, 105b, 111b, 119b, and 122b at the top of FIG. 26 are identical to the correspondingly numbered steps at the tops of FIGS. 1 and 25. They wait for, get, and in the case of an utterance, recognize, the user's input, and supply the input to a series of tests. This series of tests includes the "if delete command" test 106b, the "if pick-choice command" test 107b, the "if letter command" test 109b, and the "if edit-word command" 110b, which correspond to the similarly numbered tests in FIGS. 1 and 25. It also includes two new tests, the "if word-selection command" test 412 and the "if enter-phrase command" test 414.

If, when the program advances to polling loop 103b, the user enters a word-selection command, the test 412 will be satisfied. In the embodiment of FIG. 26 the word-selection commands include the pressing of the left and right cursor keys, which select the word to the left or right of the current selected word, provided there is such a word in the PHRASE_STARTSTRING. The word-selection commands also include the spoken commands "move_left_one", "move_left_two", etc. and "move_right_one", "move_right_two", etc., which select the word the specified number of words to the left or right of the currently selected word, provided there is such a word in the PHRASE_STARTSTRING.

If the test of step 412 is passed, the branch of the program beneath that step is performed. Step 416 selects the word indicated by the word-selection command, causing it and not the previous selected word to be shown in reverse video in the phrase definition window. Then steps 408 and 410, described above, are performed and the program advances to polling loop 103b for the next user input. It should be noted that the speech recognition of step 408 is performed using a watchdog routine that terminates that recognition and jumps to loop 103b any time it senses new input from the user. This lets the user rapidly issue successive word-selection commands, without having to wait for the completion of word recognition before each such successive command is responded to.

If, when the program advances to polling loop 103b, the user enters a pick-choice command, the test 107b is satisfied and the branch of the program below that step is performed. In the routine of FIG. 26 the pick-choice commands include the pressing of any of the keys "f1" through "f9" and any of the spoken commands "pick_one" through "pick_nine" corresponding to any of the word choices displayed in the word active window 701b or the word dictionary window 702b (shown in FIG. 36). In the phrase edit routine the pick-choice commands do not include the pressing of the "enter" key or the speaking of the word "enter_that", since in this routine these "enter" commands are used to confirm the entire phrase in the phrase definition window, as is described below.

Once the test of step 107b is satisfied, step 418 substitutes the word picked by the pick-choice command for the current selected word shown in reverse video in the phrase definition window. For purposes of simplification, the phrase edit routine of FIG. 26 only lets the user correct words to the right of the last word of the PHRASE_STRING which has already been corrected. Thus once a word has been corrected by step 418, step 420 adds the corrected word and all the preceding words in the current PHRASE_START-STRING to the ALREADY_CONFIRMED_STRING, so that those words will no longer be in the PHRASE_STARTSTRING for further editing. After this has been done, step 422 redisplays the phrase definition window 703a (shown in FIGS. 30-33), with all the words in the ALREADY_CONFIRMED_STRING underlined, followed by a space, shown in reverse video, for the new PHRASE_STARTSTRING to be rerecognized in step 424. Then step 424 performs phrase recognition against REC_TOKEN, starting with the portion of that token time aligned against the previous selected word in the recognition that produced that previous selected word. The new selected word, that chosen by the most recent pick-choice command, is used as the first word of all candidate phrases used in the phrase recognition of step 424. This rerecognition is performed so that when an error in one word of a connected phrase causes the next word to be misrecognized, the match routine can automatically correct the second error once the operator has corrected the first error. This method also allows for the possibility that the number of words in the output sequence may be different than the correct number of words. For example, if one word is mistakenly recognized as a pair of words, the operator merely corrects the first incorrect word. Once the correct (longer) word has been substituted for the first wrong word, the re-recognition will continue from the end of the corrected longer word.

Once step 424 has performed this phrase recognition, and selected the best scoring word sequence starting with the current selected word, step 426 subtracts the current selected word from that word sequence and makes the remaining words of that sequence the new PHRASE_STARTSTRING. Then the program advances to step 404, which displays the new PHRASE_STARTSTRING in the phrase definition window preceded by ALREADY_CONFIRMED_STRING, which is shown underlined to distinguish it from the PHRASE_STARTSTRING. Then step 406, selects the first word of the new PHRASE_STARTSTRING as the selected word and shows it in reverse video, step 408 performs single word recognition on the portion of REC_TOK corresponding to the selected word, and step 410 displays the word choice from this recognition. Then the program advances to polling loop 103b for the next user input.

If, when the program advances to polling loop 103b, the user enters an enter-phrase command such as the pressing of the "enter" key or the speaking of the word "enter_that", the test of step 414 will be satisfied and steps 430 and 432 are executed. The enter-phrase commands are used to indicate that the user desires to confirm the entire phrase currently in the phrase definition window. Step 430 adds the ALREADY_CONFIRMED_STRING to the start of the current PHRASE_STARTSTRING to form the phrase_startstring to be confirmed. Then step 432 jumps to step 200 in FIG. 25 with a pick-choice command which causes the branch of the program under step 107 of FIG. 25 to confirm the entire PHRASE_STARTSTRING just as if it were a multiword phrase from the phrase active window 701a which had been confirmed by the pressing of a function key.

If, when the program advances to polling loop 103b, the user enters a delete command of the type described above, the test of step 106b is met and the program advances to step 434 which jumps to location step 190 on FIG. 25. This cause the program to abort recognition of the entire token represented by REC_TOK, just as if the user had entered that delete command before ever entering the phrase edit routing of FIG. 26.

If, when the program advances to polling loop 103b, the user enters a letter command, to start, add to, or edit the WORD_STARTSTRING, the test of step 109b is met. The letter commands recognized in the phrase edit routine of FIG. 26 are the same as are those recognized in the EDITMODE in the program of FIG. 1, described above. After the test of step 109b has been met, step 436 adds the letter, if any, indicated by the letter command to the word_startstring. If, on the other hand, the letter command is the command for deleting the last character of the WORD_STARTSTRING, that last character, if any, is deleted from that string. Then step 438 restricts the active vocabulary to acoustic word models whose corresponding words start with the WORD_STARTSTRING. Next step 440 restricts the backup vocabulary to up to nine words from the backup dictionary which start with the WORD_STARTSTRING and which are selected by the language model filter as most likely given the word which immediately proceeds the selected word. Then step 442 displays the WORD_STARTSTRING in a word definition window 705 (shown in FIG. 35), which is shown in reverse video in the part of the PHRASE_DEFINITION window where the selected word formerly was located.

Once this is done, step 409 performs single word rerecognition upon REC_TOK starting at the portion of that token time aligned with the start of the selected word. This recognition uses the same algorithm as is used in the recognition of step 408, except that it uses the restricted vocabulary produced by step 438. This recognition also uses a watchdog routine which jumps to polling loop 103b if the user enters any input before the recognition is complete, so that, if the user rapidly enters a sequence of letter commands, the system does not have to complete a separate rerecognition after the entry of each before responding to the next.

After step 409 selects one or more best scoring rerecognition words, step 446 displays those choices in rank order, each with a function key number next to it, in the word active window 701b below the word definition window 705. Immediately below the word active window, step 446 also displays the backup words in a word dictionary window 702b. If there are enough words in the backup vocabulary selected by step 440 to do so, step 446 displays enough of these words to bring the total number of words displayed in both windows 701b and 702b to 9, so that each of the function keys "f1" through "f9" will have a word choice displayed next to it. Once step 409 is performed the program advances to polling loop 103b for more user input.

If, when the program advances to polling loop 103b, the user enters an edit-word command, to select one of the words displayed next to a function key in the windows 701b or 702b for insertion into the WORD_STARTSTRING for editing, the test of step 110b is met. The edit-word commands are the same as the edit-choice commands described above with regard to FIG.

1. They include the double-clicking of any function key "f1" through "f9", and the saying of any command "edit_one" through "edit_nine", associated with one of the word choices displayed in the windows 701b or 702b.

When such an edit-word command is detected and the test of step 110b is met, step 448 makes the chosen word indicated by the edit-word command the WORD_STARTSTRING. Then the sequence of steps 438 through 446 described above are performed, just as if the user had just finished entering all of the letters in the spelling of the chosen word into the WORD_STARTSTRING by a sequence of letter-commands.

Referring now to FIGS. 29-36, the operation of the phrase edit routine will be further demonstrated.

Figure 29:

The example of these figures assumes the user starts by saying the phrase "A new display". In response, the example assumes step 123a of FIG. 25, recognizes this phrase, step 108 detects that step 123a recognized a new utterance, and step 176a displays the results of this recognition in the phrase active window 701a, as indicated in FIG. 29, and then goes back to polling loop 103 for the user's response.

The user recognizes that the closest response is either that associated with "f1" or "f2", so he double-clicks "f1" to indicate that its associated phrase is to be edited. In response the test of step 110 of FIG. 25 is met, the selected phrase "a nudist play" is made the PHRASE_STARTSTRING, and the test of step 302 causes the program to jump to J1 on FIG. 26, the start of the phrase edit routine. Step 404 then displays the PHRASE_STARTSTRING in the phrase definition window 703a. Step 406 makes the first word "a" of the PHRASE_STARTSTRING the selected word and shows it in reverse video in the phrase definition window. Then step 408 performs single word recognition on REC_TOK, starting at the start of that token, since the first word "a" is the selected word. Step 410 displays the choices from that recognition in the word active window 701b, and the program advances to 103b to await the user's response. This leaves the display looking like FIG. 30.

The user presses the right cursor key to select the second word of the PHRASE_STARTSTRING, the word "nudist" as the first word to be corrected. This causes the test of step 412 to be met. As a result step 416 makes the word "nudist" the selected word and show it in reverse video. Step 408 then performs single word recognition upon REC_TOK starting with the part of that token aligned against the selected word "nudist". After this recognition is performed step 410 displays the choices from that recognition in the word active window 701b. This causes the display to have the appearance shown in FIG. 31.

Figure 32:
Figure 33:
Figure 34:

When the program next waits for the user's input, the user presses the "f2" key to confirm the word "new" to replace the former selected word "nudist". Step 107b responds to this pick-choice command by causing the branch of the program beneath it to be executed. Step 418 substitutes "new" for "nudist" in the PHRASE_STARTSTRING. Step 420 adds all the words of the phrase_startstring up to and including this new word, the words "a new", to the ALREADY_CONFIRMED_STRING. Step 422 redisplays the phrase definition window with the ALREADY_CONFIRMED_STRING shown underlined and the rest of the window shown in reverse video, as indicated in FIG. 32.

Then step 424 performs phrase recognition against REC_TOK starting with the part of the token formerly time aligned against the word "nudist". It performs this recognition with the possible sequence of word choices all limited to sequences starting with the just picked word "new". When this recognition has selected a best scoring word sequence, which in our example is the sequence "new display", step 426 subtracts the picked word "new" from the start of it and makes the one or more remaining words of the sequence, in this case the single word "display", the new PHRASE_STARTSTRING. Once this is done the program advances to step 404 which redisplays the phrase definition window with the ALREADY_CONFIRMED_STRING underlined, followed by the new PHRASE_STARTSTRING. Then step 406 selects the first word of the new phrase_startstring and displays it in reverse video in the phrase definition window. Next step 408 performs single word recognition on REC_TOK starting on the portion of that token time aligned against the start of "display" in the last recognition of step 424. Then step 410 displays the best scoring word choices from that recognition in the window 701b before returning to polling loop 103b for the next input. This causes the display shown in FIG. 33.

In response the user presses the "enter" key. This causes the test of step 414 to be met. Then step 430 adds the ALREADY_CONFIRMED_STRING, "a new", to the start of the PHRASE_STARTSTRING, "display", to form the PHRASE_STARTSTRING, "a new display". Then step 432 jumps back to step 200 on FIG. 25, causing the PHRASE_STARTSTRING to be treated as a confirmed string, in the manner described before. After this is done each of the words of this display are used to make an acoustic model, update the language model, and output to the application program, causing the display to appear as in FIG. 34.

Figure 31:
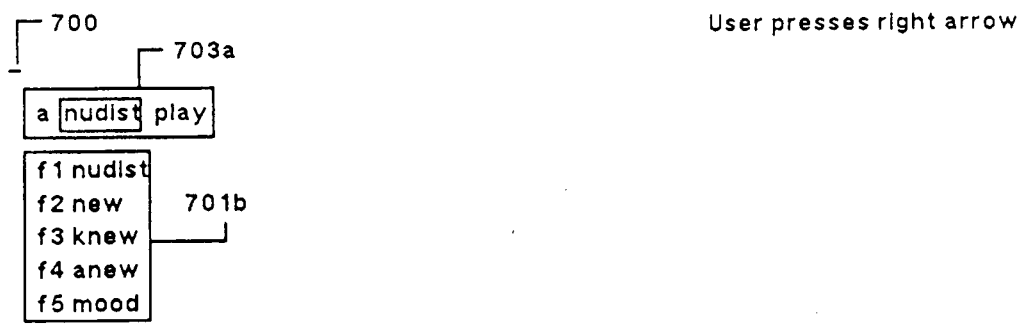
Figure 35:
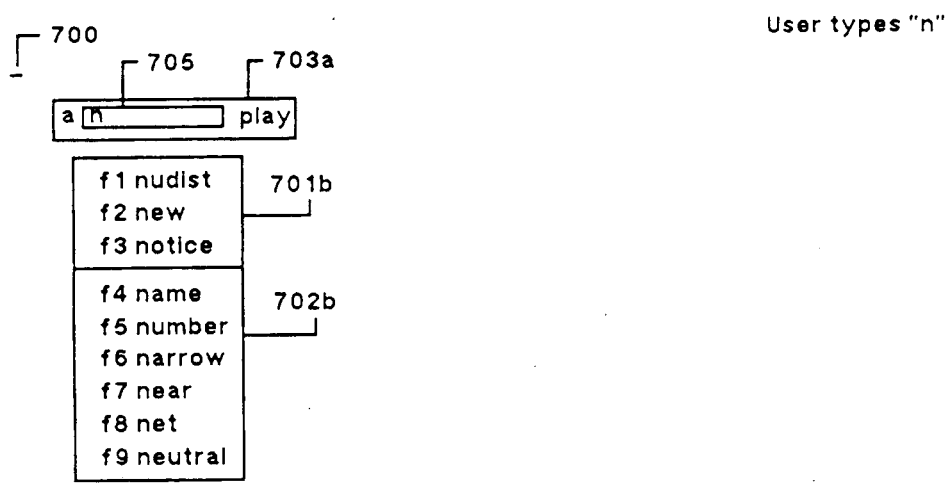

Referring now to FIG. 35, if, in our example, the user, after seeing the display shown in FIG. 31, decided to correct the selected word "nudist" by entering the letter command "n", a different sequence of events would have resulted. Although in the example of FIG. 31 the correct word "new" was displayed, it will often be the case that it is not and the user may need to use the letter commands or the edit-word commands to enter the desired word.

If the user presses the "n" key after seeing the display of FIG. 31, the test of step 109b will be met. Step 436 will add the letter "n" to the end of the formerly empty WORD_STARTSTRING. Step 438 will restrict the active vocabulary to words starting with the letter "n". Step 440 will pick a backup vocabulary of words starting with that letter. Step 442 will display the WORD_STARTSTRING "n" in the word definition window 705 which pops up in the phrase definition window in place of the selected word. Step 409 performs rerecognition on the portion of REC_TOK corresponding to the selected word using the restricted active vocabulary. And step 446 displays the word choices resulting from that rerecognition along with backup words in the windows 701b and 702b. This produces the display shown in FIG. 35.

Figure 36:
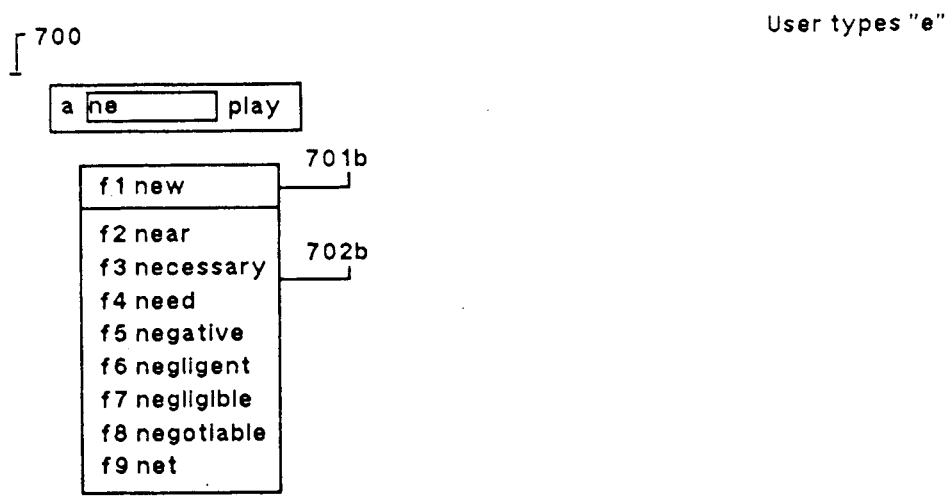

In our example it is assumed the user types the letter "e", even though the desired word "new" is already shown as a selectable word choice. In response to the typing of this letter the steps 109b, 436, 438, 440, 442, 409, and 446 are all repeated over again producing a WORD_STARTSTRING of "ne", and a group of choices in the word active window 701b and word dictionary window 702b which all start with that string as shown in FIG. 36. At this point the user presses the "f1" key to confirm the word choice "new". Then the branch of the program under step 107b, responds to this choice in the exact same manner described above with regard to FIGS. 32 and 33.

It should be understood from the description of the branch of the program under step 110b, the user can also make any one of the word choices displayed in a word active window 701b or a word dictionary window 702b the WORD_STARTSTRING merely by double-clicking the function key associated with that word choice or saying the corresponding spoken edit-word command. This will have the same results as if he or she had typed all of the letters of that word into the WORD_STARTSTRING.

It can be seen that the present invention provides a speech recognition system which improves the speed and accuracy with which users can dictate desired text. It does this by making it easier to correct errors and enter new words into the vocabulary. The invention provides an interactive speech recognition system in which the user can begin productive work on large vocabulary, natural language dictation tasks with little or no advance training of word models. This is because the invention enables a user to add words to the speech recognition vocabulary in a quick and easy manner, by building acoustic models from tokens that are collected during actual use of the system, rather than during a separate training or enrollment process. And it lets the user enter the spelling of new words that are added to the vocabulary with a minimum of keystrokes. The invention also develops a language model for use in a speech recognition system which is customized to a user's particular dictation, without requiring much additional effort to obtain such customization. It can also be seen that the invention provides a system which enables a user to easily correct errors made in continuous speech recognition.

Those skilled in the art of computing and speech recognition will understand that the invention described above, and in the claims that follow, can be embodied in many different ways. For example, the embodiments described above are contained largely in computer programs designed to run on general purpose computers such as the IBM PC AT and the COMPAQ 386, but it will be clear to those skilled in the computer and electronic arts that many or all of the basic functions of this invention could be performed in special purpose hardware. It will also be clear to those skilled in the computer arts that the steps of the program described above, when represented as program instructions loaded into program memory represent means for accomplishing the tasks of their associated steps, and thus such programs constitute both means and methods for purposes of a patent application.

In the embodiment of the invention described here, functions are usually selected either by pressing keys or speaking a command. It should be understood, however, that any other method by which the operator may enter commands and characters into a computer could be used instead. For example, a pointing device such as a mouse (or cursor keys) may be used to choose items from a choice menu, or even to choose letters from a menu of the alphabet.

In the embodiment of the invention shown in FIGS. 25 and 26, the speech recognition system described was designed to perform continuous speech recognition on discretely spoken words or words spoken in brief multiword phrases. It should be understood however that the basic concepts of this embodiment could be applied to a system designed to recognize continuous speech of unlimited length. In such a case the phrase active window shown could show the best scoring plurality of word sequences recognized for the last several seconds of speech. Either in addition or alternately, the system could make an acoustic description of all the speech recognized during a given session, and use each word recognized to label the portion of that description associated with that recognized word. In such an embodiment, the user could return to any word of the output text produced by the recognizer which he or she desired to correct, and the system would enable phrase recognition starting at the portion of the acoustic description corresponding to the word to be corrected in the general manner described with regard to FIGS. 25 and 26.

Those skilled in the computing arts will recognize that even though the embodiments of the invention described above were designed to operate as terminate-and-stay-resident keyboard emulators, it would be very easy, in alternate embodiments, to fully integrate the invention into a particular application program, such as a word processor, spreadsheet, or any other application into which text is entered.

It should also be understood that the present embodiment could be used with speech recognition systems in which the acoustic word models are stored, and the speech recognition is performed in a distributed manner, such as in a system using a neural net architecture.

Accordingly, the present invention should not be considered to be limited by the description herein of the preferred embodiment, but rather should be interpreted in accordance with the following claims:

What is claimed is:

1. A system for creating word models comprising:
   means for making an acoustic model from one or more utterances of a word;
   means for enabling a user to associate a sequence of textual characters with that acoustic model, said means including:
      means for indicating to the user a menu of one or more sequences of textual characters;
      means for enabling the user to select a given character sequence from the menu;
      means for enabling the user to edit the selected character sequence to make it represent a different sequence of characters;
      means for associating said edited character sequence with said acoustic model.

2. A speech recognition system including the system for creating word models recited in claim 1, wherein:
   said speech recognition system further includes:
      means for making an acoustic description of a given portion of speech to be recognized;
      means for temporarily storing said acoustic description;
      means for storing acoustic models of the type referred to in claim 1 for each of a plurality of words;
      means for storing a sequence of textual characters in association with each acoustic model; and
      recognition means for selecting which one or more of said acoustic models best matches said acoustic description and for producing a list of those best matching acoustic models;

said means for indicating a menu includes means for providing the user a menu of the character sequences associated with the best matching acoustic models on the list produced by the recognition means; and said means for making an acoustic model includes means for using as one of the utterances used in the making of said acoustic model said acoustic description used by said recognition means in selecting the characters sequences indicated in said menu.

3. A speech recognition system including the system for creating word models recited in claim 1, wherein:

said system further includes:

means for making an acoustic description of a menu selection command to be recognized;

means for storing acoustic models of a plurality of menu selection commands each associated with one of the sequences of textual characters indicated by said menu; and recognition means for selecting which of said menu selection command models best matches said acoustic description of said menu selection command to be recognized; and said means for enabling the user to select a given character sequence from the menu includes means for using said means for making an acoustic description of said menu selection command to be recognized, said means for storing menu selection command models, and said recognition means to respond to the user's speaking of a menu selection command by selecting the character sequence from the menu corresponding to the best matching menu selection command model selected by said recognition means.

4. A speech recognition system including the system for creating word models recited in claim 1, wherein:

said system further includes means for making an acoustic description of an editing command to be recognized;

means for storing acoustic models of a plurality of editing commands each associated with a function for editing a sequence of textual characters;

recognition means for selecting which one or more of said editing command acoustic models best matches said acoustic description of said editing command to be recognized;

said means for enabling the user to edit the selected character sequence includes means for using said means for making an acoustic description of said editing command to be recognized, said means for storing editing command acoustic models, and said recognition means to respond to the user's speaking of an editing command by performing upon the selected character sequence the editing function corresponding to the best matching editing command acoustic model selected by said recognition means.

5. A speech recognition system which includes the system for creating word models described in claim 1, said speech recognition system further including:

means for representing a body of text comprised of one or more words and for representing a word insertion location relative to said text;

means for storing a plurality of acoustic models, each of which is associated with a word;

recognition means for recognizing a spoken word by selecting one of said acoustic model which matches said spoken word; and means for inserting a representation of either the word associated with the acoustic model selected by said recognition means or said character sequence selected and edited by the user into said body of text at said word insertion location.

6. An adaptive speech recognition method for recognizing a plurality of spoken words over a period of time and for improving a set of acoustic models used during that recognition, said method comprising the steps of:

storing a set of said acoustic models, with each said model being stored in association with a word label;

forming an acoustic description of the sound of each of a succession of spoken words to be recognized substantially as each such word is spoken, each of said acoustic descriptions including acoustic data on the sound of the spoken word it describes;

performing automatic speech recognition upon the acoustic descriptions of said succession of spoken words by comparing the acoustic description of each such spoken word against a plurality of said acoustic models to select, substantially as each such word is spoken, which one or more of said models best matches it, by indicating to a user of the system said one or more best matching model's one or more associated word labels, and by responding to feedback from said user to select one of said indicated word labels, or another word label as being associated with said acoustic description;

storing at least some of said acoustic descriptions in association with the word label associated with it by said speech recognition;

updating the acoustic models associated with individual word labels in conjunction with which one or more of said acoustic descriptions have been stored by finding the one or more acoustic descriptions currently stored in association with that word label and by merging acoustic data from those one or more acoustic descriptions to make updated versions of those acoustic models;

storing the updated acoustic models in said set of models and using those updated acoustic models in the subsequent performance of said automatic speech recognition upon successive ones of said spoken words.

7. A speech recognition system comprising:

means for making an acoustic description of a given portion of speech to be recognized, as spoken by a given group of one or more speakers;

means for storing a plurality of individually trained acoustic word models, each of which is associated with a given word, and each of which is derived from acoustic data produced by having one or more speakers from said given group speak one or more utterances of its associated word;

means for storing a plurality of phonetic acoustic word models, each of which is associated with a given word, and none of which are derived from acoustic data produced by having any speakers from said given group speak its associated word;

recognition means for comparing both said individually trained and said phonetic acoustic word models against said acoustic description of a given portion of speech to be recognized and for selecting which one or more of said models best match said acoustic description.

8. A speech recognition system comprising:

means for making an acoustic description of a given portion of speech to be recognized;

means for storing a first, acoustically selectable, set of machine responses, each of which is associated with a word;

means for storing an acoustic word model of the word associated with each of said acoustically selectable machine responses;

means for storing a second, non-acoustically selectable, set of machine responses, each of which is associated with a word;

recognition means for selecting which one or more of said acoustic models best match said acoustic description;

recognition indicating means for indicating to a user the corresponding one or more acoustically selectable machine responses associated with those best matching models;

filtering means for selecting a subset of said non-acoustically selectable machine responses, said filtering means making said selection without performing a match between said acoustic description and any acoustic word models;

filtering indicating means for indicating to the user the non-acoustically selectable machine responses selected by the filtering means;

means for enabling a user to select one of the indicated acoustically selectable or non-acoustically selectable machine responses as a desired machine response.

9. A speech recognition system as recited in claim 8, wherein said filtering means includes means for enabling the user to enter one or more textual characters, and for limiting the filtered subset to non-acoustically selectable machine responses whose associated words include the entered characters.

10. A speech recognition system as recited in claim 8, wherein:

said system further includes language model means for indicating the probability that a given word to be recognized will be each of a plurality of words based on statistical information on the frequency of each such word's use;

said filtering means includes means for selecting said filtered subset of said non-acoustically selectable machine responses based on the probabilities of their associated words being spoken as indicated by said language model means.

11. A speech recognition system as recited in claim 10, wherein:

said system is designed to recognize a word spoken in the context of one or more other words;

said system further includes means for representing the language context of a word to be recognized;

said language model means includes means for responding to said representation of the language context of the word to be recognized by indicating the probabilities that the word to be recognized will be each of a plurality of words based on statistical information on the frequency of each such word's use in that language context.

12. A speech recognition system as in claim 8, wherein said recognition indicating means and said filtering indicating means include means for indicating to the user which machine responses are selected by the recognition means and which are selected by the filtering means.

13. A speech recognition system as in claim 8, wherein said system further includes means for responding to the selection of one of the indicated non-acoustically selectable machine responses as the desired machine response by making an acoustic word model for the word associated with that machine response using acoustic data from the acoustic description of the given portion of speech to be recognized, by making the selected machine response a member of the first, acoustically selectable, set of machine responses, and by storing the acoustic word model created for that machine response in said means for storing acoustic word models.

14. A speech recognition system as in claim 8, wherein:

said means for making an acoustic description includes means for making an acoustic description of a response selection command to be recognized;

said system further includes means for storing acoustic models of a plurality of response selection commands each associated with one of the machine responses indicated by said recognition indicating means or said filtering indicating means;

said recognition means further includes means for selecting which one or more of said response selection command models best matches said acoustic description of said response selection command to be recognized; and said means for enabling the user to select one of said acoustically selectable or non-acoustically selectable machine responses includes means for using said means for making an acoustic description of said response selection command to be recognized, said means for storing response selection command models, and said recognition means to respond to the user's speaking of a machine response selection command, by selecting the machine response corresponding to the best matching response selection command model selected by said recognition means.

15. A system for enabling a user to create word models for use in speech recognition comprising:

means for storing a set of machine responses;

means for enabling a user to enter filtering information which does not uniquely identify a desired machine response, but which does specify a subset of machine responses to which the desired machine response belongs; and filtering means for responding to the entry of such filtering information by selecting a subset of said machine responses which is limited to the subset specified by the filtering information, means for indicating to the user one or more machine responses from the subset selected by the filtering means;

means for enabling the user to select which of the indicated machine responses is the response to be associated with a word model to be trained, without requiring the user to enter all the information contained in the machine response;

means for making an acoustic description of a given portion of speech;

means for incorporating data from that acoustic description into an acoustic word model associated with the selected machine response.

16. A system as in claim 15, wherein:

said means for making an acoustic description include means for making an acoustic description of a given portion of speech to be recognized;

said system further includes means for storing acoustic models of a plurality of words, each associated with one of said set of machine responses;

said filtering means includes means for selecting from said acoustic models an active set of acoustic models which is limited to those acoustic models whose associated machine responses are within the subset specified by said filtering information entered by the user;

said system also further includes recognition means for comparing said active set of acoustic models against said acoustic description to be recognized to select which one or more of said acoustic models in said active set best matches said acoustic description to be recognized; and said means for indicating to the user one or more machine responses from the subset selected by the filtering means includes means for indicating the one or more machine responses associated with the one or more acoustic models selected by said recognition means as best matching said acoustic description to be recognized.

17. A system as in claim 15, wherein:

said means for making an acoustic description includes means for making an acoustic description of a response selection command to be recognized;

said system further includes:
  means for storing acoustic models of a plurality of response selection commands each associated with one of the indicated machine responses; and
  recognition means for selecting which one or more of said machine response selection command models best matches said acoustic description of said response selection command to be recognized;

said means for enabling the user to select an indicated machine response includes means for using said means for making an acoustic description of a response selection command to be recognized, said means for storing response selection command models, and said recognition means to respond to the user's speaking of a response selection command by selecting the indicated machine response corresponding to the best matching response selection command model selected by said recognition means.

18. A system as in claim 15, wherein:

said means for making an acoustic description includes means for making an acoustic description of a filtering command to be recognized;

said system further includes:
  means for storing acoustic models of a plurality of filtering commands, each of which is associated with filtering information which specifies a subset of said set of machine responses; and
  recognition means for selecting which one or more of said filtering command models best matches said acoustic description of said filtering command to be recognized;

said means for enabling the user to enter filtering information includes means for using said means for making an acoustic description of said filtering command to be recognized, said means for storing filtering command models, and said recognition means to respond to the user's speaking of a filtering command by entering the filtering information associated with the best matching filtering command model selected by said recognition means.

19. A system as in claim 15, wherein:

said machine responses each have associated with them a spelling comprised of a sequence of characters;

said means for enabling the user to enter filtering information includes means for enabling the user to enter a string of one or more characters as said filtering information; and said filtering means includes means for selecting a subset of machine responses associated with spellings which contain the string of one or more characters entered by said user.

20. A system as in claim 19, wherein:

said means for enabling the user to enter a string includes means for enabling the user to enter a string of one or more initial characters which specify the initial characters of the spellings of a desired subset of machine responses;

said system further includes means for enabling the user to edit the string of initial characters once it has been entered;

said filtering means includes means for responding to the editing of said string by selecting a subset of machine responses whose associated spellings start with the entered string of initial characters, as edited.

21. A system as in claim 20, wherein:

said means for enabling the user to enter a string of one or more initial characters includes:
  means for indicating to the user one or more character strings;
  means for enabling the user to select one of the indicated character strings without having to enter all the characters in that string; and
  means for entering the selected character string as the string of one or more initial characters; and said means for enabling the user to edit the string of initial characters enables the user to edit the selected character string after it has been selected and entered.

22. A system as in claim 21, wherein said means for indicating one or more character strings includes means for selecting said one or more character strings from a larger set of character string without comparing acoustic models associated with the selected strings against an acoustic description of speech to be recognized.

23. A system as in claim 21, wherein:

said means for making an acoustic description includes means for making an acoustic description of a given portion of speech to be recognized; and said means for indicating one or more character strings includes:
  means for storing acoustic word models;
  means for storing a character string to be associated with each acoustic word model;
  recognition means for comparing an active set of said acoustic word models against said acoustic description to be recognized to select which one or more of said active set of acoustic models best match said acoustic description to be recognized; and
  means for indicating to the user as said character strings said one or more character strings associated with the acoustic models selected by said recognition means.

24. A system as in claim 23, wherein said means for indicating one or more character strings further includes:

means for enabling the user to enter one or more first round filtering characters; and a first round filtering means for responding to the entry of the first round filtering characters by limiting the active set of acoustic word models used by said recognition means to a subset of said acoustic models whose associated character string contains the one or more first round filtering characters.

25. A speech recognition system which includes the system for enabling a user to create word models described in claim 15, said speech recognition system further including:

means for representing a body of text comprised of one or more words and for representing a word insertion location relative to said text;

means for storing a word in association with each of said machine responses;

recognition means for recognizing a spoken word by selecting a word which matches said spoken word; and means for inserting a representation of either the word selected by said recognition means or the word associated with the indicated machine response selected by the user into said body of text at said word insertion location.

26. A system for enabling a user to create word models for use in speech recognition comprising:

means for storing a set of machine responses;

means for storing a word in association with each of said machine responses;

language model means for indicating the probability that a given word to be trained will be each of a plurality of said stored words based on statistical information on the frequency of each such stored word's use;

filtering means for selecting a subset of said machine responses based on the probabilities, indicated by said language model means, of the stored word associated with each such machine response;

means for indicating to the user the one or more machine responses selected by the filtering means;

means for enabling the user to select which of the indicated machine responses is the response to be associated with a word model to be trained, without requiring the user to enter all the information contained in the machine response;

means for making an acoustic description of a given portion of speech spoken by the user;

means for incorporating data from that acoustic description into an acoustic model associated with the selected machine response.

27. A system as in claim 26, wherein:

each machine response has associated with it a spelling comprised of a sequence of characters;

said system further includes means, responsive to the selection by the user of one of said indicated machine responses, for enabling the user to edit the sequence of characters associated with said selected machine response; and said means for incorporating data from an acoustic description into an acoustic model associated with the selected machine response, includes means for associating the acoustic model with the edited sequence of characters.

28. A system as in claim 26, wherein:

said system further includes means for representing a current language context, said current language context including a body of text containing one or more words and an insertion location representing a particular location relative to that body of text where a word could be inserted;

said language model means includes means for responding to said representation of the current language context by indicating the probabilities that a word to be inserted at said insertion location would be each of a plurality of words based on statistical information on the frequency of each such word's use in the current language context; and said filtering means includes means for selecting said subset of machine responses based on the probabilities, indicated by said language model means, of the word associated with each such machine response given said current language context.

29. A speech recognition system which includes the system for enabling a user to create word models described in claim 28, wherein:

said speech recognition system includes recognition means for recognizing a word, spoken in the current language context represented by said means for representing a language context, by selecting a word which matches said spoken word;

means for inserting a representation of either the word selected by said recognition means or the word associated with the indicated machine response selected by the user into said body of text at said insertion location.

30. A system as in claim 26, wherein:

said means for making an acoustic description includes means for making an acoustic description of a response selection command to be recognized;

said system further includes means for storing acoustic models of a plurality of response selection commands each associated with one of said indicated machine responses; and recognition means for selecting which one or more of said response selection command models best matches said acoustic description of said response selection command to be recognized; and said means for enabling the user to select an indicated machine response includes means for using said means for making an acoustic description of said response selection command, said means for storing response selection command models, and said recognition means to respond to the user's speaking of a response selection command by selecting the indicated machine response corresponding to the best matching response selection command model selected by said recognition means.

31. A continuous speech recognition system comprising:

means for making an acoustic description of a given portion of speech to be recognized;

means for storing acoustic models of a plurality of words;

recognition means for matching sequences of two or more acoustic word models against said portion of speech and for selecting a plurality of the best matching word sequences, each representing a sequence of two or more words whose corresponding sequence of two or more acoustic models provides one of the best matches against said acoustic description;

means for indicating to a user each of said plurality of best matching word sequences; and means for enabling the user to select one of the indicated best matching word sequences for use as an output, without requiring the user to enter each word in the selected sequence.

32. A continuous speech recognition system as in claim 31, wherein:

said means for making an acoustic description includes means for making an acoustic description of a word sequence selection command to be recognized;

said system further includes means for storing acoustic models of a plurality of word sequence selection commands each associated with one of the indicated best matching word sequences;

said recognition means further includes means for selecting which one or more of said word sequence selection command models best matches said acoustic description of said word sequence selection command to be recognized;

said means for enabling the user to select one of the indicated best matching word sequences includes means for using said means for making an acoustic description of said word sequence selection command to be recognized, said means for storing word sequence selection commands, and said recognition means to respond to the user's speaking of a word sequence selection command by selecting that one of the indicated best matching word sequences which corresponds to the best matching word sequence selection command model selected by said recognition means.

33. A continuous speech recognition system comprising:

means for making an acoustic description of a given portion of speech to be recognized;

means for storing acoustic models of a plurality of words;

recognition means for matching sequences of acoustic word models against said acoustic description and for selecting a best matching word sequence, representing a sequence of words whose sequence of corresponding acoustic models provide one of the best matches against said acoustic description;

means for indicating the words of said best matching word sequence to a user;

means for enabling the user to select an individual word from the indicated best matching sequence of words;

means for enabling the user to correct the indicated best matching word sequence by correcting the selected word;

means for using the indicated best matching word sequence, with the corrected selected word as an output.

34. A continuous speech recognition system as in claim 33, wherein:

said means for making an acoustic description includes means for making an acoustic description of a word selection command to be recognized;

said system further includes means for storing acoustic models of a plurality of word selection commands each associated with one of the indicated words of the best matching word sequence;

said recognition means further includes means for selecting which one or more of said word selection command models best matches said acoustic description of said word selection command to be recognized;

said means for enabling the user to select an individual word from the indicated best matching sequence includes means for using said means for making an acoustic description of said word selection command to be recognized, said means for storing word selection commands, and said recognition means to respond to the user's speaking of a word selection command by selecting that one of the indicated words of said best matching word sequence which corresponds to the best matching word selection command model selected by said recognition means.

35. A continuous speech recognition system as in claim 33, wherein said means for enabling the user to correct the best matching word sequence includes:

means for indicating to the user a plurality of alternate choice words for replacing the word selected by the user for correction;

means for enabling the user to select one of said alternate choice words;

means for using the selected alternate choice word to replace the word selected for correction in said best matching word sequence.

36. A continuous speech recognition system as in claim 35, wherein:

said recognition means includes means for matching said sequences of acoustic word models against said acoustic description in a manner which associates individual acoustic word models of said best matching word sequence with corresponding individual portions of said acoustic description of said given portion of speech to be recognized;

said recognition means further includes means for comparing individual word models against a given portion of said acoustic description to select a plurality of words whose corresponding acoustic models best match said given portion;

said means for indicating a plurality of alternate choice words includes means for selecting as said indicated alternate choice words words which said recognition means has selected as having acoustic models which best match the individual portion of said acoustic description corresponding to the individual word selected by the user for correction.

37. A continuous speech recognition system as in claim 36, wherein:

said system further includes means for enabling the user to enter filtering information which specifies a subset of words;

said recognition mean's means for comparing individual word models against a given portion of said acoustic description includes means for increasing the probability that each of the plurality of words which it selects as a result of that comparison will belong to the subset of words specified by the filtering information.

38. A continuous speech recognition system as in claim 35, wherein:

said system further includes means for enabling the user to enter filtering information which specifies a subset of words;

said means for indicating a plurality of alternate choice words includes means for selecting certain alternate choice words which fall within the subset of words specified by said filtering information independently without comparing any acoustic model of those certain alternate choice words against said acoustic description of speech to be recognized.

39. A continuous speech recognition system as in claim 33, wherein:
said means for enabling the user to correct the best matching word sequence by correcting the selected word includes:
means for enabling the user to correct the selected word by replacing it with a corrected word;
rerecognition means for matching a plurality of sequences of one or more acoustic word models against at least a portion of the acoustic description of the given portion of speech to be recognized and for selecting one or more such word sequences which best match said acoustic description, said recognition means including means for enabling information about the corrected word to alter the outcome of the selection performed by said rerecognition means; and
means for using one of the word sequences selected by said rerecognition means as at least part of said corrected best matching word sequence.

40. A continuous speech recognition system as in claim 39, wherein:
said system further includes means for storing an acoustic model of said corrected word; and
said rerecognition means includes means for time aligning the acoustic model of the corrected word against a portion of said acoustic description to be recognized and for using that time alignment to determine the boundary in said acoustic description of a word to be selected by said rerecognition means.

41. A speech recognition system comprising:
means for storing a list of machine responses, each of which has associated with it a spelling comprised of a sequence of characters and a pronunciation;
means for storing an acoustic model for the pronunciation associated with each of the machine responses;
means for making an acoustic description of a portion of speech to be recognized;
means for enabling a user to enter a string of one or more characters as filtering information;
means for enabling the user to edit said string of characters once it has been entered;
filtering means for responding to the entry and editing of said string by selecting a subset of machine responses associated with spellings which contain the string of one or more characters as entered and edited by said user; and
recognition means for making a filtered selection of which one or more of said acoustic models best match said acoustic description of said portion of speech to be recognized, including means for causing the selection by said recognition means to favor the selection of acoustic models whose associated machine responses are in said subset selected by said filtering means.

42. A speech recognition system as in claim 41, wherein:
said means for enabling the user to enter a string of one or more characters includes:
means for indicating to the user one or more character strings;
means for enabling the user to select one of the indicated character strings without having to enter all the characters in that string; and
means for using the selected character string as said string of one or more characters entered by the user; and
said means for enabling the user to edit the string of initial characters enables the user to edit such a selected character string after it has been selected.

43. A speech recognition system as in claim 42, wherein:
said recognition means includes means for performing a first selection of which one or more of said acoustic models best match said acoustic description of said portion of speech to be recognized;
said means for indicating one or more character strings includes means for indicating as such character strings the spellings of each of the machine responses associated with the one or more best matching acoustic models selected by said recognition means in said first selection; and
said recognition means performs said filtered selection as a rerecognition of said portion of speech to be recognized after the following: said first selection, said indicating of the spellings selected by said first selection, said selection of one of the indicated character strings, its editing, and the selection of said subset by said filtering means.

44. A speech recognition system as in claim 41, wherein:
said means for making an acoustic description includes means for making an acoustic description of a string entry command to be recognized;
said system further includes means for storing acoustic models of a plurality of string entry commands each associated with a command to enter a string of the one or more characters as filtering information;
said recognition means further includes means for selecting which one or more of said string entry commands models best matches said acoustic description of said menu selection portion of speech;
said means for enabling the user to enter said string of one or more characters includes means for using said means for making an acoustic description of said string entry command to be recognized, said means for storing string entry command models, and said recognition means to respond to the user's speaking of a string entry command by entering the string of one or more characters corresponding to the best matching string entry model selected by said recognition means.

45. A speech recognition system as in claim 41, wherein:
said means for making an acoustic description includes means for making an acoustic description of an editing command to be recognized;
said system further includes means for storing acoustic models of a plurality of editing commands each associated with a function for editing said string of one or more characters entered as filtering information;
said recognition means further includes means for selecting which one or more of said editing command models best matches said acoustic description of said editing command portion of speech;
said means for enabling the user to edit the selected character sequence includes means for using said means for making an acoustic description of said editing command to be recognized, said means for storing editing command models, and said recognition means to respond to the user's speaking of an editing command spoken by the user, by performing upon the selected character sequence the editing function corresponding to the best matching editing command model selected by said recognition means.

46. A speech recognition system designed to recognized a series of spoken words, said system comprising:

language model means for indicating the probability that a given word to be recognized will be each of a plurality of vocabulary words based on statistical information on the frequency of that word's use;

means for making an acoustic description of the utterance of each of said series of spoken words to be recognized;

means for storing acoustic models of a plurality of vocabulary words;

recognition means for selecting which one or more of said vocabulary word's acoustic models best match a given acoustic description of a word to be recognized, based both on the closeness of the match between said acoustic models and said given acoustic description and on the probability indications by said language model means;

means for using the selection by said recognition means of one or more vocabulary words as best matching said given acoustic description to update the statistical information on the frequency of said one or more vocabulary words in said language model means and for causing said recognition means to use a probability based on said updated statistical information in the recognition of which vocabulary words best match acoustic descriptions of subsequent words.

47. A speech recognition system as in claim 46, wherein:

said system is designed to recognize a word spoken in the context of one or more other words;

said system further includes means for representing the language context of the word to be recognized:

said language model means includes means for responding to said representation of the language context of the word to be recognized by indicating the probabilities that the word to be recognized will be each of a plurality of words based on statistical information on the frequency of each word's use in that language context; and said means for using the selection of a given vocabulary word as best matching said given acoustic description includes means for using said selection to update statistical information on the frequency of said given vocabulary word in the language context in which that word was recognized.

48. An adaptive speech recognition method for recognizing each of a succession of spoken words over a period of time and for improving a set of acoustic models used during that recognition, said method comprising the steps of:

storing a set of said acoustic models, with each such model being stored in association with at least one word label;

forming an acoustic description of successive portions of sound containing the spoken words to be recognized, and doing so substantially as such words are spoken;

performing automatic speech recognition upon the acoustic description of successive portions of sound as the successive words are being spoken by comparing a plurality of said acoustic models against successive portions of the acoustic description to select which one or more of said models best match successive portions of said acoustic description and to associate those one or more best matching models' associated word labels with the portion of the acoustic description which those models match;

indicating to the user, as the successive words are being spoken, the one or more word labels associated with each of successive portions of said acoustic descriptions by said recognition;

providing means for enabling a user to respond, during the speaking of said succession of words, to said indication of word labels by selecting individual word labels to be associated with certain portions of said acoustic description;

in response to such selections, recalculating acoustic models associated with said word labels selected by the user, using acoustic information from the portions of the acoustic descriptions selected by the user as being associated with those word labels; and using the recalculated acoustic models in the recognition of successive ones of said spoken words.

* * * * *